US012761399B2

(12) United States Patent
Lim et al.

(10) Patent No.: US 12,761,399 B2
(45) Date of Patent: Oct. 13, 2026

(54) DISPLAY MODULE AND DISPLAY DEVICE COMPRISING THE SAME

(71) Applicant: Samsung Display Co., LTD., Yongin-si (KR)

(72) Inventors: Ho Lim, Yongin-si (KR); Taemin Kim, Yongin-si (KR); Jiyun Park, Yongin-si (KR); Donggeun Shin, Yongin-si (KR); Gihoon Yang, Yongin-si (KR); Seulgee Lee, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 350 days.

(21) Appl. No.: 18/214,364

(22) Filed: Jun. 26, 2023

(65) Prior Publication Data

US 2024/0045107 A1 Feb. 8, 2024

(30) Foreign Application Priority Data

Jul. 29, 2022 (KR) ........................ 10-2022-0095053

(51) Int. Cl.

| | |
|---|---|
| ***G02B 1/11*** | (2015.01) |
| ***G02B 1/111*** | (2015.01) |
| ***G02B 1/14*** | (2015.01) |
| ***G02B 5/00*** | (2006.01) |

(52) U.S. Cl.

CPC ................ *G02B 1/111* (2013.01); *G02B 1/14* (2015.01); *G02B 5/003* (2013.01); *G02B 2207/101* (2013.01)

(58) Field of Classification Search

CPC .......... G02B 1/111; G02B 1/14; G02B 5/003; G02B 2207/101; G02B 5/20; G02B 1/11; H10K 59/12; H10K 59/38; H10K 59/877; H10K 59/8792; H10K 50/844; H10K 50/86; C08K 5/0091; C08K 5/1545; C08K 5/18; C08K 5/23; C08K 5/3415; C08L 35/02; C08L 83/04; C08L 83/06; C08L 83/08; C08L 85/02; C09D 5/32; C09D 7/41; C09D 135/02; C09D 183/04; C09D 183/06; C09D 183/08; C09D 185/02

See application file for complete search history.

(56) References Cited

U.S. PATENT DOCUMENTS 10,088,604 B2 10/2018 Sakaguchi
11,267,973 B2 * 3/2022 Amin .................... G02B 1/115

(Continued)

FOREIGN PATENT DOCUMENTS

EP 4071523 A1 10/2022
JP 6650055 B2 2/2020

(Continued)

*Primary Examiner* — Balram T Parbadia

(74) *Attorney, Agent, or Firm* — CANTOR COLBURN LLP

(57) ABSTRACT

A display module includes: a display panel, a light control layer which is disposed on the display panel and includes quantum dots and scatterers, a color filter layer disposed on the light control overcoating layer disposed on the color filter layer, and a reflection preventing layer disposed on the overcoating layer, where the overcoating layer includes a light absorber which absorbs light in a wavelength region of about 410 nm to about 750 nm.

19 Claims, 6 Drawing Sheets

(56) References Cited

U.S. PATENT DOCUMENTS

| | | | | |
|---|---|---|---|---|
| 2003/0202137 | A1* | 10/2003 | Nakamura | G02B 5/3033 349/96 |
| 2004/0114248 | A1* | 6/2004 | Hokazono | G02B 1/14 359/603 |
| 2008/0187732 | A1* | 8/2008 | Shinohara | C03C 17/42 106/287.19 |
| 2008/0239488 | A1* | 10/2008 | Asakura | G02B 1/111 349/96 |
| 2019/0384110 | A1* | 12/2019 | Tanaka | H10K 59/35 |
| 2020/0264461 | A1* | 8/2020 | Kuwana | G02F 1/1336 |
| 2021/0341649 | A1 | 11/2021 | Lim et al. | |
| 2022/0181589 | A1 | 6/2022 | Lim et al. | |
| 2022/0320471 | A1 | 10/2022 | Lim et al. | |
| 2023/0012898 | A1* | 1/2023 | Fukagawa | H05B 33/02 |

FOREIGN PATENT DOCUMENTS

| | | | |
|---|---|---|---|
| JP | 2021039145 | A | 3/2021 |
| KR | 20080083070 | A | 9/2008 |
| KR | 101958721 | B1 | 3/2019 |
| KR | 20200039857 | A | 4/2020 |
| KR | 20210134206 | A | 11/2021 |
| KR | 20220081407 | A | 6/2022 |
| KR | 20220138546 | A | 10/2022 |
| WO | 2021162115 | A1 | 8/2021 |

* cited by examiner

DISPLAY MODULE AND DISPLAY DEVICE COMPRISING THE SAME

This U.S. application claims priority to Korean Patent Application No. 10-2022-0095053, filed on Jul. 29, 2022, and all the benefits accruing therefrom under 35 U.S.C. § 119, the content of which in its entirety is herein incorporated by reference.

BACKGROUND

The present disclosure herein relates to a display module and a display device including the same, and more particularly, to a display module having improved visibility and a display device including the same.

Various display devices used in multimedia devices such as a television, a mobile phone, a tablet computer device, and a game console are being developed. For example, in a display device including liquid crystal display elements, organic electroluminescent light emitting display elements, or the like, quantum dots are introduced to improve display quality.

Exposure of this display device to external light such as various types of lighting and natural light may fail to clearly convey images generated inside to users due to reflected light, or cause the users to suffer eye fatigue or headaches. Accordingly, there is a need for developing a technique on a display device having an excellent reflection preventing function against external light.

SUMMARY

The present disclosure provides a display module having an excellent reflection preventing effect.

The present disclosure also provides a display device having improved visibility by including the above-described display module.

An embodiment of the invention provides: a display module including a display panel; a light control layer which is disposed on the display panel and includes quantum dots and scatterers; a color filter layer disposed on the light control layer; an overcoating layer disposed on the color filter layer; and a reflection preventing layer disposed on the overcoating layer, where the overcoating layer includes a light absorber which absorbs light in a wavelength region of about 410 nanometers (nm) to about 750 nm.

In an embodiment, the overcoating layer may have a thickness of about 3 micrometers (μm) to about 15 μm.

In an embodiment, the overcoating layer may have a refractive index of about 1.45 to about 1.53.

In an embodiment, the overcoating layer may be formed of an overcoating layer-forming composition containing the light absorber, and the light absorber contained in the overcoating layer-forming composition may be contained in an amount of about 6 percentages by weight (wt %) to about 20 wt % with respect to the total weight of the overcoating layer-forming composition.

In an embodiment, the light absorber may be represented by any one among compounds in Compound Group 1, which will be described later.

In an embodiment, the overcoating layer may further include a polymer resin including at least one of a first polymer resin or a second polymer resin.

In an embodiment, the reflection preventing layer may include a first layer disposed on the overcoating layer; a second layer disposed on the first layer; and a third layer which is disposed on the second layer and has a refractive index lower than each of refractive indices of the first layer and the second layer.

In an embodiment, the reflection preventing layer may further include a fourth layer disposed between the second layer and the third layer.

In an embodiment, the first layer may have the refractive index of about 1.60 to about 1.69, the second layer may have the refractive index of about 1.70 to about 1.90, and the third layer may have the refractive index of about 1.23 to about 1.40.

In an embodiment, each of the first layer, the second layer, and the third layer may have a thickness of about 50 nm to about 150 nm.

In an embodiment, the fourth layer may have a thickness of about 20 nm to about 50 nm.

In an embodiment, the fourth layer may have a thickness of about 20 nm to about 50 nm, and a refractive index of about 1.45 to about 1.69.

In an embodiment of the invention, a display device includes a display module, where the display module includes: a display panel; a light control layer which is disposed on the display panel and includes quantum dots and scatterers; a color filter layer disposed on the light control layer; an overcoating layer disposed on the color filter layer; and a reflection preventing layer disposed on the overcoating layer. The overcoating layer includes a light absorber which absorbs light in a wavelength region of about 410 nm to about 750 nm, and the reflection preventing layer includes a first layer disposed on the overcoating layer, a second layer disposed on the first layer, and a third layer which is disposed on the second layer and has a refractive index lower than each of refractive indices of the first layer and the second layer.

In an embodiment, the overcoating layer may have refractive index of about 1.45 to about 1.53.

In an embodiment, the overcoating layer may have a thickness thicker than the first to third layers.

In an embodiment, each of the first to third layers may have a thickness of about 50 nm to about 150 nm, and the overcoating layer may have a thickness of about 3 μm to about 15 μm.

BRIEF DESCRIPTION OF THE FIGURES

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
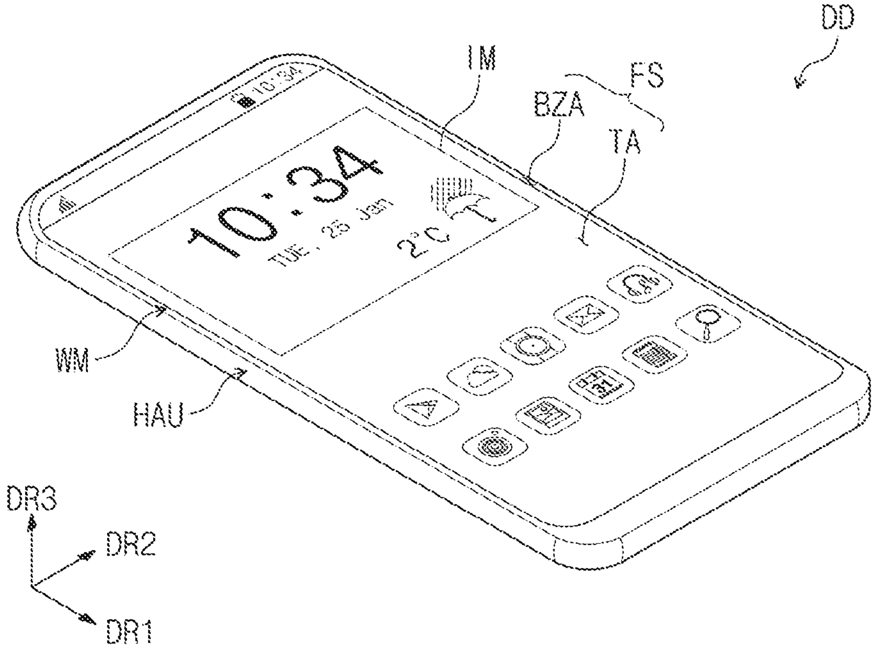
FIG. 1 is a perspective view illustrating a display device according to an embodiment of the invention.

The invention may be modified in various manners and have many forms, and thus specific embodiments will be exemplified in the drawings and described in detail in the detailed description of the invention. It should be understood, however, that it is not intended to limit the invention to the particular forms disclosed, but rather, is intended to cover all modifications, equivalents, and alternatives falling within the spirit and scope of the invention.

In the present specification, when a component (or a region, a layer, a portion, etc.) is referred to as being "on," "connected to," or "coupled to" another component, it means that the component may be directly disposed on/connected to/coupled to the other component, or that a third component may be disposed therebetween.

Meanwhile, being "directly disposed on" herein means that there are no intervening layers, films, regions, plates, or the like between a part such as a layer, a film, a region, and a plate and another part. For example, "directly disposed" may mean disposing without additional members such as an adhesive member between two layers or two members.

Like reference numerals refer to like elements. Also, in the drawings, the thicknesses, ratios, and dimensions of the components are exaggerated for effective description of technical contents. The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." The term "and/or" includes all combinations of one or more of which associated elements may define.

It will be understood that although the terms such as "first" and "second" are used herein to describe various components, these components should not be limited by these terms. These terms are only used to distinguish one component from another. For example, a first component could be termed a second component, and, similarly, a second component could be termed a first component, without departing from the scope of embodiments of the invention. The terms of a singular form may include plural forms unless the context clearly indicates otherwise.

Also, terms of "below," "on a lower side," "above," "on an upper side," or the like may be used to describe the relationships of the elements illustrated in the drawings. The terms are used as a relative concept and are described with reference to the direction indicated in the drawings. In the present specification, the expression "disposed on" may refer to the case of being disposed on a lower portion of a member as well as the case of being on an upper portion of a member.

Unless otherwise defined, all terms (including technical and scientific terms) used herein have the same meaning as commonly understood by one of ordinary skill in the art to which the invention belongs. In addition, it will be understood that terms, such as those defined in commonly used dictionaries, should be interpreted as having a meaning that is consistent with their meaning in the context of the relevant art and will not be interpreted in an idealized or overly formal sense unless expressly so defined herein.

It should be understood that the terms "comprise," or "have" are intended to specify the presence of stated features, integers, steps, operations, components, parts, or combinations thereof in the disclosure, but do not preclude the presence or addition of one or more other features, integers, steps, operations, components, parts, or combinations thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value. Hereinafter, a display panel and a display apparatus including the same according to an embodiment of the invention will be explained with reference to the accompanying drawings.

Figure 2:
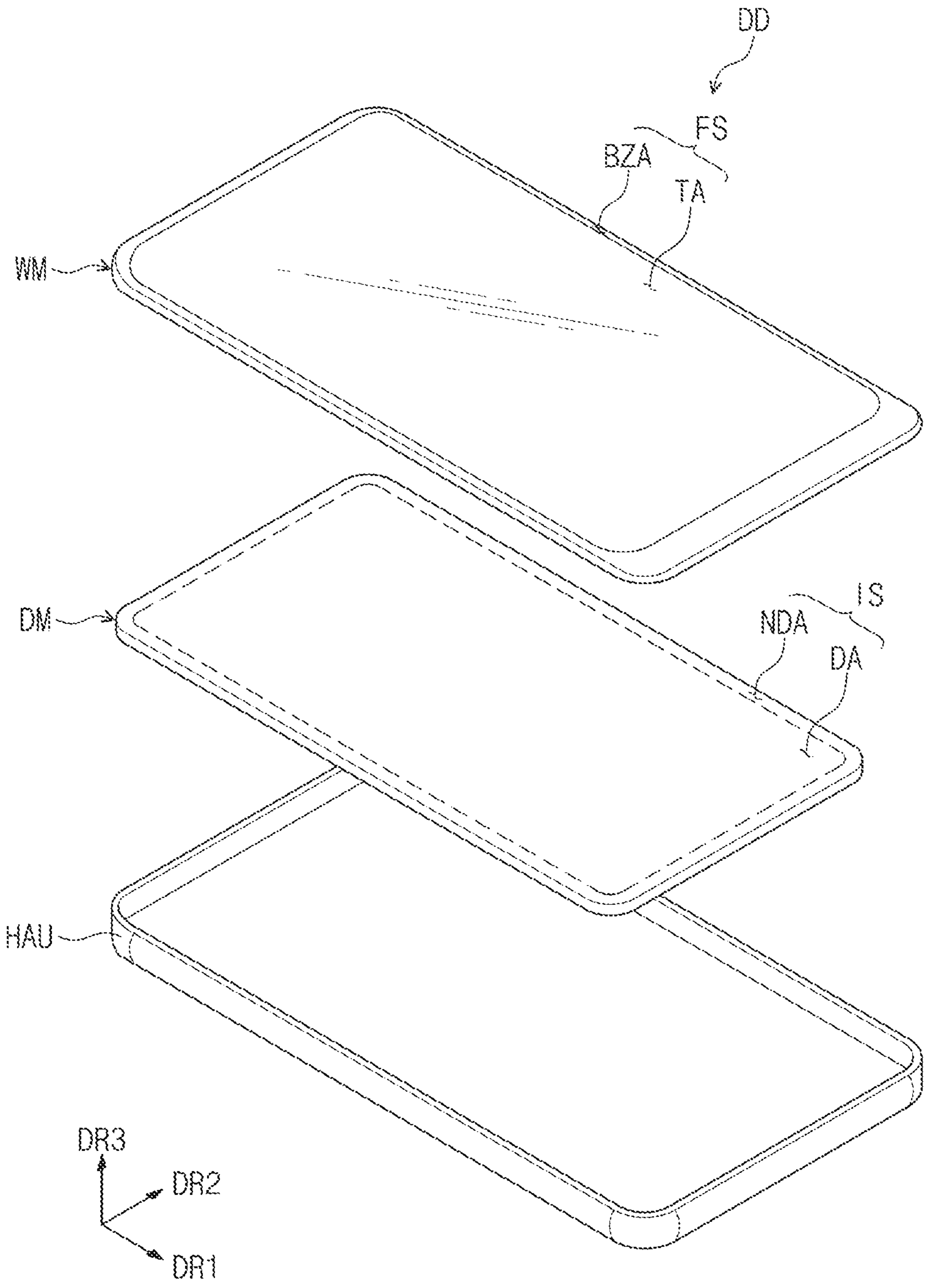
FIG. 2 is an exploded perspective view of a display device according to an embodiment of the invention.

FIG. 1 is a perspective view illustrating a display device according to an embodiment of the invention. FIG. 2 is an exploded perspective view of a display device according to an embodiment of the invention.

Referring to FIGS. 1 and 2, the display device DD may be a device activated according to electrical signals. The display device DD may display an image IM and sense an external input. The display device DD may include various embodiments. For example, the display device DD may include a tablet, a laptop, a computer, a smart television, etc. In the current embodiment, a smart phone is exemplarily illustrated as the display device DD.

The display device DD may display an image IM, toward a third direction DR3, on a display surface FS parallel to each of a first direction DR1 and a second direction DR2. The display surface FS, on which the image IM is displayed, may correspond to each of a front surface of the display device DD and a front surface FS of a window WM. The image IM may include a still image as well as a dynamic image. FIG. 1 illustrates a watch and a plurality of icons as an example of the image IM.

In an embodiment of the invention, a front surface (or a top surface) or a rear surface (or a bottom surface) of each of members may be defined based on a direction in which the image IM is displayed. The front and rear surfaces may be opposite to each other in the third direction DR3. A normal direction of each of the front and rear surfaces may be parallel to the third direction DR3. A spaced distance between the front and rear surfaces in the third direction DR3 may correspond to the thickness of the display panel DP in the third direction DR3. Directions indicated by the first to third directions DR1, DR3, and DR3 are relative concepts, and may be converted to different directions. Hereinafter, first to third directions refer to the same reference symbols as the directions indicated by the first to third directions DR1, DR2, and DR3, respectively. In addition, in the present specification, "on a plane" or "in a plan view" may be defined as viewed from the third direction DR3.

The display device DD according to an embodiment of the invention may detect user's inputs applied from the outside. The user's inputs include various types of external inputs such as a portion of user's body, light, heat, or a pressure. The user's inputs may be provided in various types, and the display device DD may sense the user's input applied to a side surface or a rear surface of the display device DD according to a structure of the display device DD. However, the embodiment of the invention is not limited thereto.

As illustrated in FIGS. 1 and 2, the display device DD includes a window WM, a display module DM, and an outer case HAU. In an embodiment, the window WM and the outer case HAU are coupled to define an outer appearance of the display device DD. In an embodiment, the outer case HAU, the display module DM, and the window WM may be sequentially stacked in the third direction DR3.

The window WM may include an optically clear material. The window WM may include an insulating panel. For example, the window WM may be made of glass, plastic, or a combination thereof.

As described above, the front surface FS of the window WM defines a front surface of the display device DD. The transmission region TA may be an optically clear region. For example, the transmission region TA may be a region having a visible light transmittance of about 90% or greater.

A bezel region BZA may have a light transmittance relatively lower than the transmission region TA. The bezel region BZA defines a shape of the transmission region TA. The bezel region BZA may be adjacent to the transmission region TA, and may surround the transmission region TA.

The bezel region BZA may have a certain color. The bezel region BZA may cover the non-display region NDA of the display module DM to prevent the non-display region NDA from being viewed from the outside. However, this is merely illustrated as an example. The bezel region BZA may be omitted in the window WM according to an embodiment of the invention.

The display module DM may display an image IM and sense an external input. The image IM may be displayed on the display surface IS of the display module DM. The display surface IS of the display module DM may include a display region DA and a non-display region NDA.

In an embodiment, the display region DA may be a region in which the image IM is displayed. The transmission region TA may at least overlap the display region DA. For example, the transmission region TA may overlap the front surface or at least a portion of the display region DA in a plan view. Accordingly, the user may view the image IM through the transmission region TA.

The non-display region NDA may be a region in which the image IM is not displayed. The non-display region NDA may be a region covered by the bezel region BZA. The non-display region NDA is adjacent to the display region DA. The non-display region NDA may surround the display region DA. In the display device DD of an embodiment, the non-display region NDA may be emitted.

Figure 3:
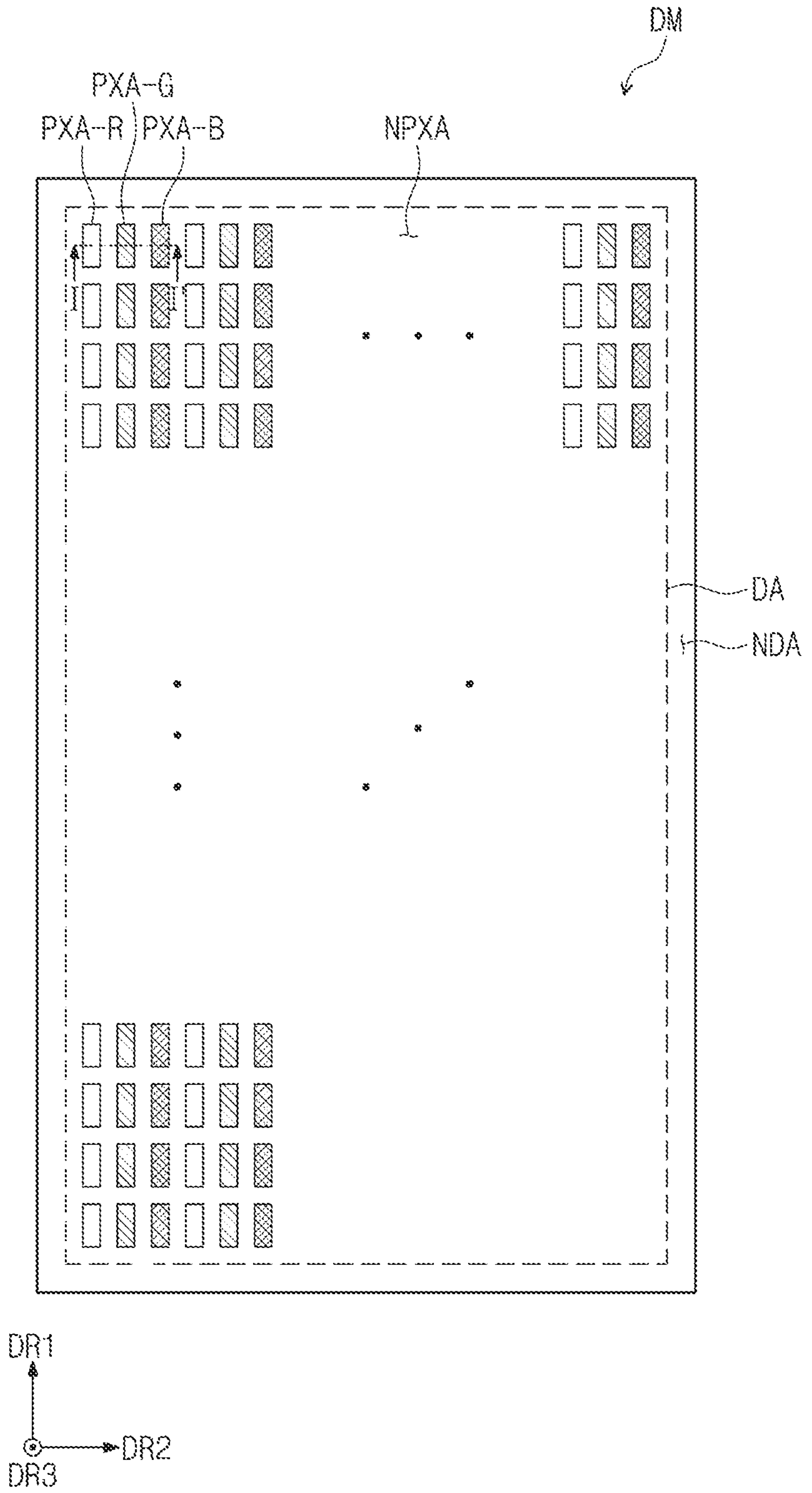
FIG. 3 is a plan view of a display module according to an embodiment of the invention.
Figure 4A:
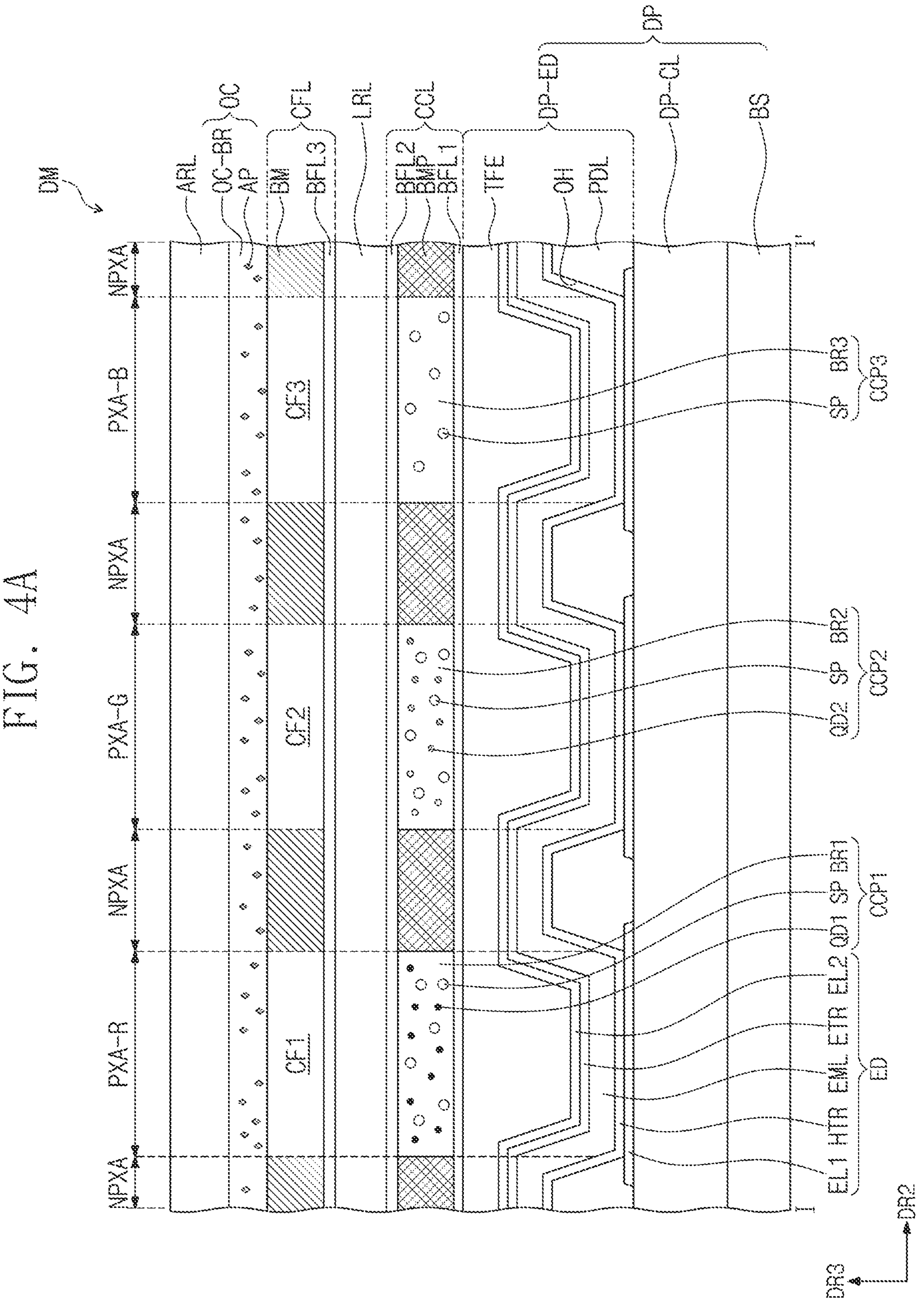
FIG. 4A is a cross-sectional view of a display module according to an embodiment of the invention.
Figure 4B:
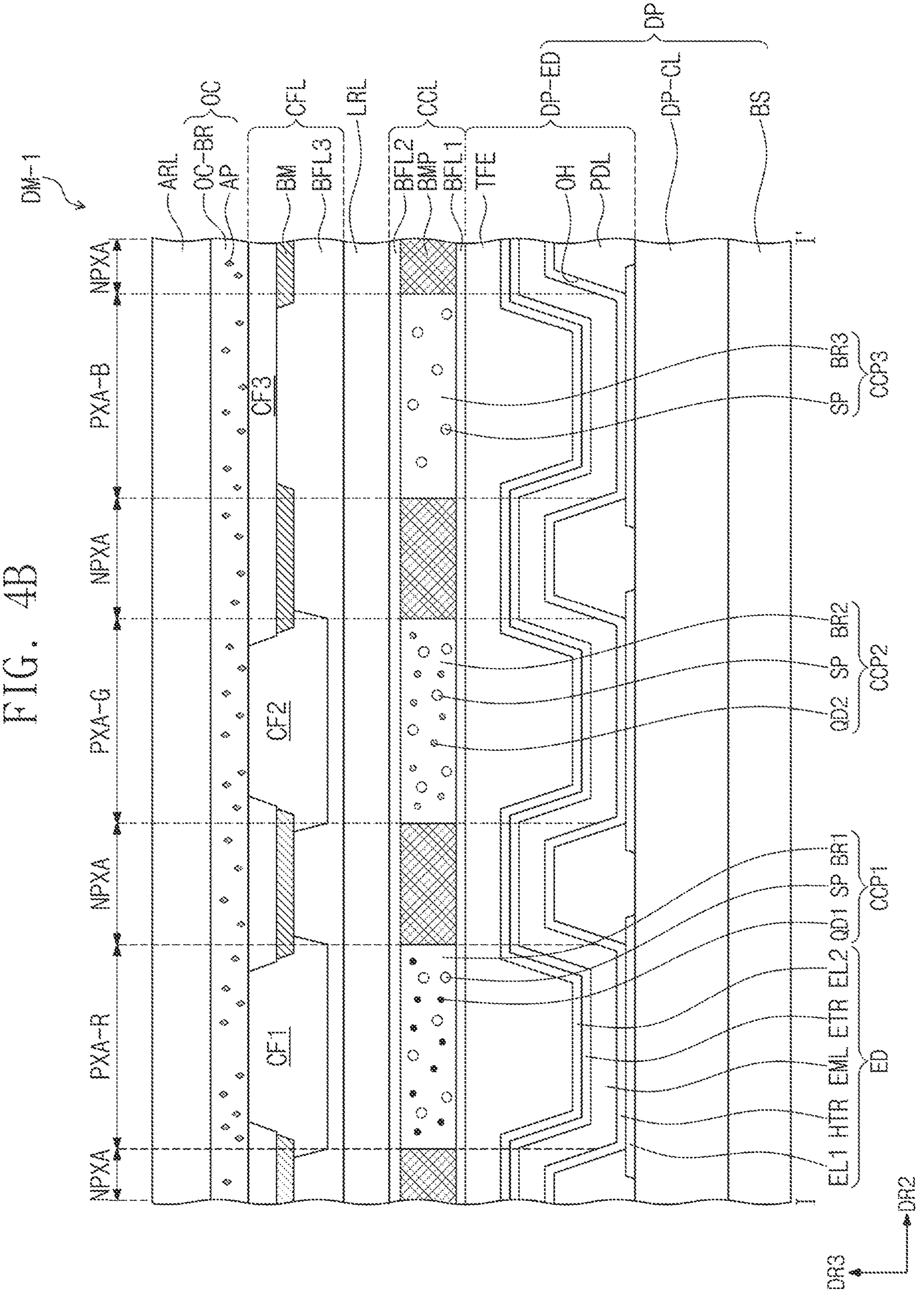
FIG. 4B is a cross-sectional view of a display module according to another embodiment of the invention.

FIG. 3 is a plan view of a display module according to an embodiment of the invention. Each of FIGS. 4A and 4B is a cross-sectional view of a display module according to an embodiment of the invention. Each of FIGS. 4A and 4B is a cross-sectional view illustrating a part taken along line I-I' of FIG. 3.

Referring to FIGS. 3 and 4A, the display module DD may include a non-light emitting region NPXA and light emitting regions PXA-R, PXA-G and PXA-G. The light emitting regions PXA-B, PXA-G, and PXA-R each may be a region in which light generated in the light-emitting element ED is emitted. The light emitting regions PXA-R, PXA-G, and PXA-G may be spaced apart from each other on a plane (i.e., in a plan view). Each area of the light emitting regions PXA-R, PXA-G, and PXA-B is illustrated to be the same, but the embodiment of the invention is not limited thereto, and each area may be different from each other. In this case, the area may refer to an area when viewed on a plane.

The light emitting regions PXA-R, PXA-G, and PXA-B may be divided into a plurality of groups depending on the colors of emitted light. In the display module DM of an embodiment illustrated in FIGS. 3 and 4A, three light emitting regions PXA-R, PXA-G, and PXA-B which emit red light, blue light, and green light, respectively are exemplarily illustrated. For example, the display module DM of an embodiment may include the red light emitting region PXA-R, the green light emitting region PXA-G, and the blue light emitting region PXA-B that are separated from each other.

The light emitting regions PXA-R, PXA-G, and PXA-B in the display module DM according to an embodiment may be arranged in a stripe form. Referring to FIG. 3, the plurality of red light emitting regions PXA-R, the plurality of green light emitting regions PXA-G, and the plurality of blue light emitting regions PXA-B each may be arranged in the first direction DR1. In addition, the red light emitting region PXA-R, the green light emitting region PXA-G, and the blue light emitting region PXA-B may be alternately arranged in this order in the second direction DR2.

FIGS. 3 and 4A illustrate that all the light emitting regions PXA-R, PXA-G, and PXA-B have similar area, but the embodiment of the invention is not limited thereto. Thus, the light emitting regions PXA-R, PXA-G, and PXA-B may have different areas from each other according to the wavelength range of the emitted light in another embodiment. For example, the area of the green light emitting region PXA-G may be larger than each of areas of the blue light emitting region PXA-B and the red light emitting region PXA-R, and the area of the blue light emitting region PXA-B may be the same as the area of the red light emitting region PXA-R. The "areas" of the light emitting regions PXA-R, PXA-G, and PXA-B may refer to areas when viewed on a plane defined by the first direction DR1 and the second direction DR2. FIG. 3 exemplarily illustrates that the red light emitting region PXA-R, the green light emitting region PXA-G, and the blue light emitting region PXA-B each have a rectangular shape, but the embodiment of the invention is not limited thereto, and the light emitting regions PXA-R, PXA-G, and PXA-B may have various polygonal shapes or circular shape in another embodiment.

An arrangement form of the light emitting regions PXA-R, PXA-G, and PXA-B is not limited to the feature illustrated in FIG. 3, and the order in which the red light emitting region PXA-R, the green light emitting region PXA-G, and the blue light emitting region PXA-B are arranged may be provided in various combinations according to the characteristics of display quality required in the display device DD. For example, the arrangement form of the light emitting regions PXA-R, PXA-G, and PXA-B may be a pentile (PENTILE™) arrangement form or a diamond (Diamond Pixel™) arrangement form in another embodiment.

Referring to FIG. 4A, the display module DM of an embodiment may include a display panel DP and a light control layer CCL disposed on the display panel DP. In addition, the display module DM according to an embodiment may include a color filter layer CFL disposed on the light control layer CCL, an overcoating layer OC disposed on the color filter layer CFL, and a reflection preventing layer ARL disposed on the overcoating layer OC.

The display panel DP may be a light emitting display panel. For example, the display panel DP may be an organic electroluminescence display panel or a quantum dot light emitting display panel. The display panel DP may include a base layer BS, a circuit layer DP-CL provided on the base layer BS, and the display element layer DP-ED. The display element layer DP-ED may include a pixel defining film PDL, the light emitting element ED disposed between portions of the pixel defining film PDL, and an encapsulation layer TFE disposed on the light emitting element ED.

The base layer BS may be a member which provides a base surface on which the display element layer DP-ED is disposed. The base layer BS may be a glass substrate, a metal substrate, a plastic substrate, etc. However, the embodiment is not limited thereto, and the base layer BS may be an inorganic layer, an organic layer, or a composite material layer in another embodiment.

In an embodiment, the circuit layer DP-CL is disposed on the base layer BS, and the circuit layer DP-CL may include a plurality of transistors (not shown). Each of the transistors (not shown) may include a control electrode, an input electrode, and an output electrode. For example, the circuit layer DP-CL include a switching transistor and a driving transistor for driving the light emitting element ED of the display element layer DP-ED.

The pixel defining film PDL may be formed of a polymer resin. For example, the pixel defining film PDL may include a polyacrylate-based resin or a polyimide-based resin. The pixel defining films PDL may include a light absorbing material or a black pigment or a black dye. Also, the pixel defining film PDL may be formed of an inorganic material. For example, the pixel defining film PDL may include silicon nitride (SiNx), silicon oxide (SiOx), silicon oxynitride (SiOxNy), etc. The pixel defining film PDL may define the light emitting areas PXA-R, PXA-G, and PXA-B. The light emitting regions PXA-R, PXA-G, and PXA-B and the non-light emitting region NPXA may be divided by the pixel defining film PDL:

The display element layer DP-ED includes the light emitting element ED. The light emitting element ED may include the first electrode EL1, the hole transport region HTR, the emission layer EML, the electron transport region ETR, and the second electrode EL2. The hole transport region HTR, the emission layer EML, the electron transport region ETR, and the second electrode EL2 may be provided as a common layer in the light emitting element ED. The light emitting element ED may emit first color light having a single wavelength region. The first color light may be light in a luminescence wavelength of about 410 nanometers (nm) to about 480 nm. For example, the first color light emitted by the light emitting element ED may be blue light.

Unlike the feature illustrated, in an embodiment, the hole transport region HTR, the emission layer EML, and the electron transport region ETR may be provided by being patterned in the opening OH defined in the pixel defining film PDL. For example, the hole transport region HTR, the emission layer EML, and the electron transport region ETR, etc. of the light emitting element ED in an embodiment may be provided by being patterned in an inkjet printing method. When the emission layer EML is provided by being patterned, each emission layer EML may emit the first color light in the same wavelength region. The first color light may be blue light. The emission layer EML may emit light in a wavelength region of about 410 nm to about 480 nm.

In another embodiment, the light emitting element ED may include a plurality of light emitting structures which are sequentially disposed between the first electrode EL1 and the second electrode EL2. That is, the light emitting element ED may be a tandem-type light emitting element. The plurality of light emitting structures each may include an emission layer, and a hole transport region and an electron transport region which are disposed with the emission layer located therebetween. A charge generation layer may be disposed between the plurality of light emitting structures. For example, three light emitting structures including emission layers which emit blue light and one light emitting structure including an emission layer which emits green light may be included. However, the embodiment of the invention is not limited thereto, and the arrangement order between the light emitting structures or the number of the light emitting structure may be modified variously.

The encapsulation layer TFE may cover the light emitting element ED. The encapsulation layer TFE may seal the display element layer DP-ED. The encapsulation layer TFE may be disposed on the second electrode EL2 and may be disposed filling the opening OH. The encapsulation layer TFE may be disposed directly on the second electrode EL2. The encapsulation layer TFE may be a thin film encapsulation layer. The encapsulation layer TFE may be formed by laminating one layer or a plurality of layers. The encapsulation layer TFE includes at least one insulation layer. The encapsulation layer TFE according to an embodiment may include at least one inorganic film (hereinafter, an encapsulation-inorganic film). The encapsulation layer TFE according to an embodiment may also include at least one organic film (hereinafter, an encapsulation-organic film) and at least one encapsulation-inorganic film.

The encapsulation-inorganic film protects the display element layer DP-ED from moisture/oxygen, and the encapsulation-organic film protects the display element layer DP-ED from foreign substances such as dust particles. The encapsulation-inorganic film may include silicon nitride, silicon oxynitride, silicon oxide, titanium oxide, aluminum oxide, or the like, but the embodiment of the invention is not particularly limited thereto. The encapsulation-organic film may include an acrylic-based compound, an epoxy-based compound, or the like. The encapsulation-organic film may include a photopolymerizable organic material, but the embodiment of the invention is not particularly limited thereto.

The light control layer CCL may be disposed on the display panel DP. The light control layer CCL may include a plurality of light control parts CCP1, CCP2 and CCP3. The light control parts CCP1, CCP2 and CCP3 may be spaced apart from each other in the second direction DR2. Referring to FIG. 4A, divided patterns BMP may be disposed between the light control parts CCP1, CCP2 and CCP3 which are spaced apart from each other, but the embodiment of the invention is not limited thereto. FIG. 4A illustrates that the divided patterns BMP do not overlap the light control parts CCP1, CCP2 and CCP3 in a plan view, but at least a portion of the edges of the light control parts CCP1, CCP2 and CCP3 may overlap the divided patterns BMP.

In an embodiment, the light control layer CCL may include a first light control part CCP1 configured to convert first color light to third color light, a second light control part CCP2 configured to convert the first color light to second color light, and a third light control part CCP3 configured to transmit the first color light. The third color light may be light in a longer wavelength region than the first color light and the second color light, and the second color light may be light in a longer wavelength region than the first color light. For example, the first color light may be light in a luminescence wavelength of about 410 nm to about 480 nm, the second color light may be light in a luminescence wavelength of about 500 nm to about 600 nm, and the third color light may be light in a luminescence wavelength of about 620 nm to about 700 nm. The first color light may be blue light, the second color light may be green light, and the third color light may be red light.

The first light control part CCP1 and the second light control part CCP2 may include a light conversion body. The light conversion body may be particles which convert the wavelength of the provided light and emit light having another wavelength. For example, the light conversion body may be a quantum dot or a phosphor. In an embodiment, the first light control part CCP1 may include a first quantum dot QD1 which converts the first color light to the third color light, and the second light control part CCP2 may include a second quantum dot CCP2 which converts the first color light to the second color light. The third light control part CCP3 may be a transmission part which does not convert but transmits the wavelength of the first color light, and may not include a separate light conversion body. However, the embodiment of the invention is not limited thereto, and the third light control part CCP3 may include the light conversion body such as quantum dot which converts the incident light to the first color light in another embodiment.

Each core of the first quantum dot QD1 and the second quantum dot QD2 may be selected from among a Group II-VI compound, a Group III-VI compound, a Group I-III-VI compound, a Group III-V compound, a Group III-II-V compound, a Group IV-VI compound, a Group IV element, a Group IV compound, and a combination thereof.

The Group II-VI compound may be selected from the group consisting of a binary compound selected from the group consisting of CdSe, CdTe, CdS, ZnS, ZnSe, ZnTe, ZnO, HgS, HgSe, HgTe, MgSe, MgS, and a mixture thereof, a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof, and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof.

The Group III-VI compound may include a binary compound such as $In_2S_3$ or $In_2Se_3$, a ternary compound such as $InGaS_3$ or $InGaSe_3$, or any combination thereof.

The Group I-III-VI compound may be selected from a ternary compound selected from the group consisting of AgInS, $AgInS_2$, CuInS, $CuInS_2$, $AgGaS_2$, $CuGaS_2$ $CuGaO_2$, $AgGaO_2$, $AgA_1O_2$, and a mixture thereof, or a quaternary compound such as $AgInGaS_2$ or $CuInGaS_2$.

The Group III-V compound may be selected from the group consisting of a binary compound selected from the group consisting of GaN, GaP, GaAs, GaSb, AlN, AIP, AlAs, AlSb, InN, InP, InAs, InSb, and a mixture thereof, a ternary compound selected from the group consisting of GaNP, GaNAs, GaNSb, GaPAs, GaPSb, AlNP, AlNAs, AlNSb, AlPAs, AlPSb, InGaP, InAIP, InNP, InNAs, InNSb, InPAs, InPSb, and a mixture thereof, and a quaternary compound selected from the group consisting of GaAINP, GaAINAs, GaAINSb, GaAlPAs, GaAlPSb, GaInNP, GaInNAs, GaInNSb, GaInPAs, GaInPSb, InAINP, InAINAs, InAINSb, InAIPAs, InAIPSb, and a mixture thereof. The Group III-V compound may further include a Group II metal. For example, InZnP, etc. may be selected as a Group III-II-V compound.

The Group IV-VI compound may be selected from the group consisting of a binary compound selected from the group consisting of SnS, SnSe, SnTe, PbS, PbSe, PbTe, and a mixture thereof, a ternary compound selected from the group consisting of SnSeS, SnSeTe, SnSTe, PbSeS, PbSeTe, PbSTe, SnPbS, SnPbSe, SnPbTe, and a mixture thereof, and a quaternary compound selected from the group consisting of SnPbSSe, SnPbSeTe, SnPbSTe, and a mixture thereof. The Group IV element may be selected from the group consisting of Si, Ge, and a mixture thereof. The Group IV compound may be a binary compound selected from the group consisting of SiC, SiGe, and a mixture thereof.

In this case, the binary compound, the ternary compound, or the quaternary compound may be present in a particle with a uniform concentration distribution, or may be present in the same particle with a partially different concentration distribution. In addition, the quantum dot may have a core/shell structure in which one quantum dot surrounds another quantum dot. The core/shell structure may have a concentration gradient in which the concentration of elements present in the shell decreases toward the core.

In some embodiments, the quantum dots QD1 and QD2 may have the above-described core/shell structure including a core containing nanocrystals and a shell surrounding the core. The shell of the quantum dots QD1 and QD2 may serve as a protective layer to prevent the chemical deformation of the core of the quantum dots QD1 and QD2 so as to maintain semiconductor properties, and/or a charging layer to impart electrophoresis properties to the quantum dots. The shell of the quantum dots QD1 and QD2 may be a single layer or a multilayer. An example of the shell of the quantum dots may include a metal or non-metal oxide, a semiconductor compound, or a combination thereof.

For example, the metal or non-metal oxide may be a binary compound such as $SiO_2$, $Al_2O_3$, $TiO_2$, ZnO, MnO, $Mn_2O_3$, $Mn_3O_4$, CuO, FeO, $Fe_2O_3$, $Fe_3O_4$, CoO, $Co_3O_4$, or NiO, or a ternary compound such as $MgAl_2O_4$, $CoFe_2O_4$, $NiFe_2O_4$, or $CoMn_2O_4$, but the embodiment of the invention is not limited thereto.

Also, examples of the semiconductor compound may include CdS, CdSe, CdTe, ZnS, ZnSe, ZnTe, ZnSeS, ZnTeS, GaAs, GaP, GaSb, HgS, HgSe, HgTe, InAs, InP, InGaP, InSb, AlAs, AlP, AlSb, etc., but the embodiment of the invention is not limited thereto.

The quantum dots QD1 and QD2 each may have a full width of half maximum ("FWHM") of a light emission wavelength spectrum of about 45 nm or less, preferably about 40 nm or less, and more preferably about 30 nm or less, and color purity or color reproducibility may be improved in the above range. In addition, light emitted through quantum dots QD1 and QD2 is emitted in all directions so that a wide viewing angle may be improved.

In addition, although each form of the quantum dots QD1 and QD2 is not particularly limited as long as it is a form commonly used in the art, and more specifically, a quantum dot in the form of spherical, pyramidal, multi-arm, or cubic nanoparticles, nanotubes, nanowires, nanofibers, nanoplate particles, etc. may be used.

In addition, the light control layer CCL may include a scatterer SP. The first light control part CCP1 may include the first quantum dot QD1 and the scatterer SP, the second light control part CCP2 may include the second quantum dot QD2 and the scatterer SP, and the third light control part CCP3 may not include any quantum dot but include the scatterer SP.

The scatterer SP may be inorganic particles. For example, the scatterer SP may include at least one of $TiO_2$, ZnO, $Al_2O_3$, $SiO_2$, or hollow sphere silica. The scatterer SP may include any one among $TiO_2$, ZnO, $Al_2O_3$, $SiO_2$, and hollow sphere silica, or may be a mixture of at least two materials selected from among $TiO_2$, ZnO, $Al_2O_3$, $SiO_2$, and hollow sphere silica.

The first light control part CCP1, the second light control part CCP2, and the third light control part CCP3 each may include base resins BR1, BR2, and BR3 in which the quantum dots QD1 and QD2 and the scatterer SP are dispersed. In an embodiment, the first light control part CCP1 may include the first quantum dot QD1 and the scatterer SP dispersed in a first base resin BR1, the second light control part CCP2 may include the second quantum dot QD2 and the scatterer SP dispersed in a second base resin BR2, and the third light control part CCP3 may include the scatterer SP dispersed in a third base resin BR3. The base resins BR1, BR2, and BR3 are media in which the quantum dots QD1 and QD2 and the scatterer SP are dispersed, and may be formed of various resin compositions, which may be generally referred to as a binder. For example, the base resins BR1, BR2, and BR3 may be acrylic-based resins, urethane-based resins, silicone-based resins, epoxy-based resins, etc. The base resins BR1, BR2, and BR3 may be transparent resins. In an embodiment, the first base resin BR1, the second base resin BR2, and the third base resin BR3 may be the same as or different from each other.

The light control layer CCL may include a first barrier layer BFL1 and a second barrier layer BFL2. Each of the first barrier layer BFL1 and the second barrier layer BFL2 may serve to prevent the penetration of moisture and/or oxygen (hereinafter, referred to as "moisture/oxygen"). The first barrier layer BFL1 may be disposed on the lower portion of the light control parts CCP1, CCP2, and CCP3 and the second barrier layer BFL2 may be disposed on the light control parts CCP1, CCP2, and CCP3 to block the light control parts CCP1, CCP2 and CCP3 from being exposed to moisture/oxygen. The first barrier layer BFL1 may cover the display element layer DP-ED, and the second barrier layer BFL2 may cover the light control parts CCP1, CCP2, and CCP3.

Each of the first and second barrier layers BFL1 and BFL2 may include at least one inorganic layer. That is, the first and second barrier layers BFL1 and BFL2 may include an inorganic material. For example, the first and second barrier layers BFL1 and BFL2 may include a silicon nitride, an aluminum nitride, a zirconium nitride, a titanium nitride, a hafnium nitride, a tantalum nitride, a silicon oxide, an aluminum oxide, a titanium oxide, a tin oxide, a cerium oxide, a silicon oxynitride, a thin metal film which secures a light transmittance, etc. The first and second barrier layers BFL1 and BFL2 may further include an organic film. The first and second barrier layers BFL1 and BFL2 may include a single layer or a plurality of layers.

The color filter layer CFL may be disposed on the light control layer CCL. The color filter layer CFL may include a light shielding part BM and a plurality of filters CF1, CF2, and CF3. The plurality of filters CF1, CF2 and CF3 may be disposed to be spaced apart in the second direction DR2. The light shielding part BM may be disposed between the plurality of filters CF1, CF2 and CF3.

In an embodiment, the color filter layer CFL may include a first filter CF1 configured to transmit the third color light, a second filter CF2 configured to transmit the second color light, and a third filter CF3 configured to transmit the first color light. The first filter CF1 may be provided to the red light emitting region PXA-R and the second filter CF2 may be provided to the green light emitting region PXA-G. In addition, the third filter CF3 may be provided to the blue light emitting region PXA-B. Meanwhile, the first to third filters CF1, CF2, and CF3 may not be provided to the non-light emitting region NPXA, and the light shielding part BM may be provided.

The first to third filters CF1, CF2 and CF3 may be disposed corresponding to the first to third light control parts CCP1, CCP2 and CCP3 included in the light control layer CCL. For example, the first filter CF1 may be disposed corresponding to the first light control part CCP1 and transmit light in a wavelength region of about 620 nm to about 700 nm. The second filter CF2 may be disposed corresponding to the second light control part CCP2 and transmit light in a wavelength region of about 500 nm to about 600 nm. The third filter CF3 may be disposed corresponding to the third light control part CCP3 and transmit light in a wavelength region of about 410 nm to about 480 nm. The first filter CF1 may transmit red light, and block blue light and green light. The second filter CF2 may transmit green light and block red light and blue light. The third filter CF3 may transmit blue light, and block green light and red light.

The filters CF1, CF2, and CF3 each may include a polymeric photosensitive resin and a pigment or dye. The first filter CF1 may include a red pigment or dye, the second filter CF2 may include a green pigment or dye, and the third filter CF3 may include a blue pigment or dye. Meanwhile, the embodiment of the invention is not limited thereto, and the third filter CF3 may not include a pigment or dye in another embodiment. The third filter CF3 may include a polymeric photosensitive resin and may not include a pigment or dye. The third filter CF3 may be transparent. The third filter CF3 may be formed of a transparent photosensitive resin.

The light shielding part BM may be a black matrix. The light shielding part BM may include an organic light shielding material or an inorganic light shielding material containing a black pigment or dye. The light shielding part BM may prevent light leakage, and may separate boundaries between the adjacent filters CF1, CF2, and CF3. The edge of the light shielding part BM may overlap the edge of the divided patterns BMP on a plane (i.e., in a plan view). The edge of the light shielding part BM may overlap the edge of the divided patterns BMP in the third direction DR3. Meanwhile, the light shielding part BM may be omitted as illustrated in FIG. 4A.

In an embodiment, the color filter layer CFL may include the third barrier layer BFL3. The third barrier layer BFL3 may serve to prevent the penetration of moisture and/or oxygen (hereinafter, referred to as "moisture/oxygen"). The third barrier layer BFL3 may cover the first to third filters CF1, CF2, and CF3 to =block the first to third filters CF1, CF2, and CF3 from being exposed to moisture/oxygen. The third barrier layer BFL3 may include at least one inorganic layer. That is, the third barrier layer BFL3 may include an inorganic material. For example, the third barrier layer BFL3 may include a silicon nitride, an aluminum nitride, a zirconium nitride, a titanium nitride, a hafnium nitride, a tantalum nitride, a silicon oxide, an aluminum oxide, a titanium oxide, a tin oxide, a cerium oxide, a silicon oxynitride, a thin metal film which secures a light transmittance, etc. The third barrier layer BFL3 may further include an organic film. The third barrier layer BFL3 may be composed of a single layer or a plurality of layers.

In an embodiment, a low refractive layer LRL may be disposed between the light control layer CCL and the color filter layer CFL. The low refractive layer LRL may be a layer having a refractive index lower than the light control layer CCL and the color filter layer CFL which are adjacent to the low refractive layer LRL. The low refractive layer LRL may have a refractive index of about 1.25 or less. The low refractive layer LRL may have a thickness thicker than a third layer IL3 (see FIG. 5A). For example, the thickness of the low refractive layer LRL may be about 1 μm or greater. Meanwhile, the low refractive layer LRL may be omitted.

The low refractive layer LRL may totally reflect a portion of blue light emitted in the direction toward the color filter layer CFL in the light control layer CCL to be re-incident on to the light control layer CCL. The blue light may be light emitted from the light emitting element ED. A portion of the blue light may be caused to be re-incident on to a first light control part CCP1 or a second light control part CCP2 included in the light control layer CCL. As described above, the first light control part CCP1 may change the re-incident blue light into red light, and the third color control part CCP2 may change the re-incident blue light into green light. The light efficiency of the display device DD may be improved through such recirculation of light.

In an embodiment, the overcoating layer OC may be disposed on the color filter layer CFL. The overcoating layer OC may include the light absorber AP which absorbs light in a wavelength region of about 410 nm to about 750 nm. The overcoating layer OC may include the light absorber AP to absorb the scattered light caused by the scatterer SP included in the light control layer CCL and absorb the reflected light of external light. Accordingly, the display module DM of an embodiment may reduce the reflectance of the display panel DP and reduce specular component excluded ("SCE") reflected light.

The light absorber AP is not particularly limited as long as the material of the light absorber is able to absorb light in a wavelength region of about 410 nm to about 750 nm, and a dye, a pigment, etc. which can absorb the light in the above wavelength region, may be used. For example, the light absorber AP may be any one in Compound Group 1:

[Compound Group 1]

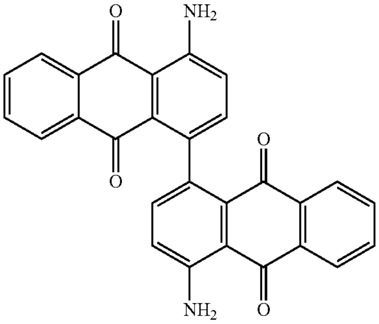

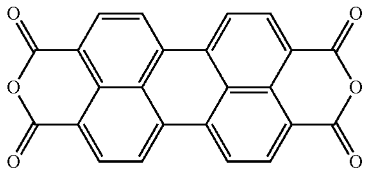

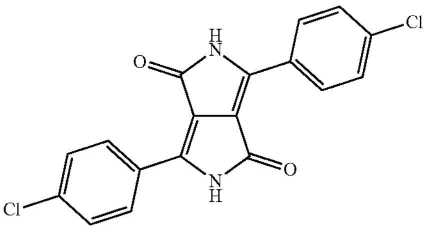

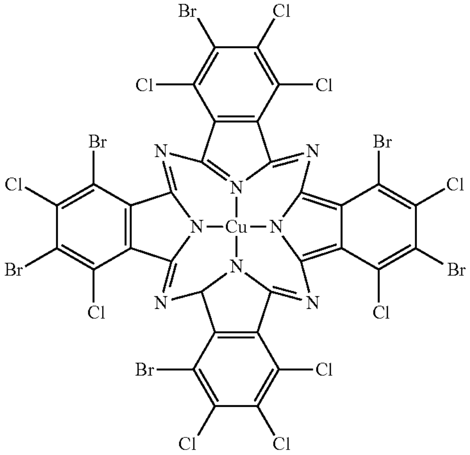

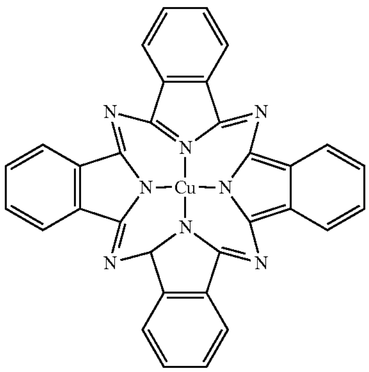

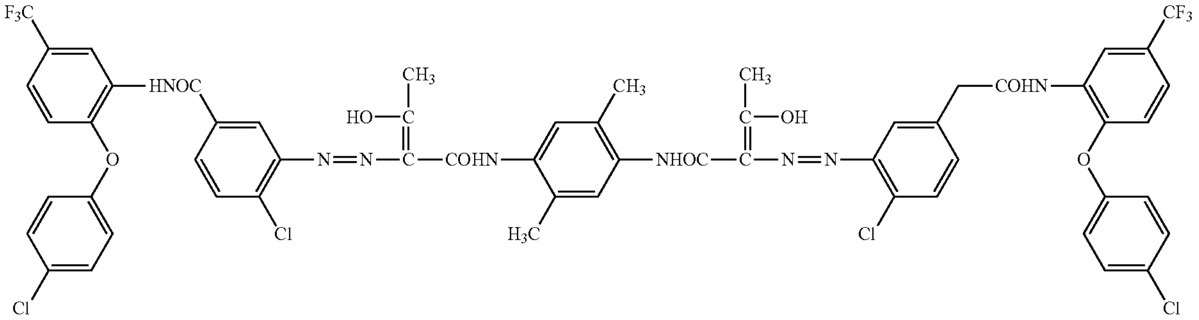

-continued
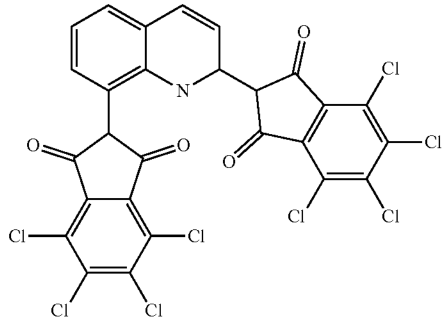
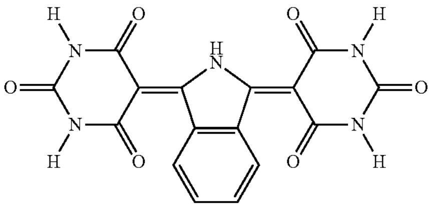
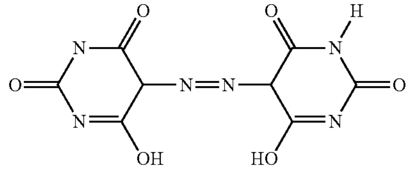
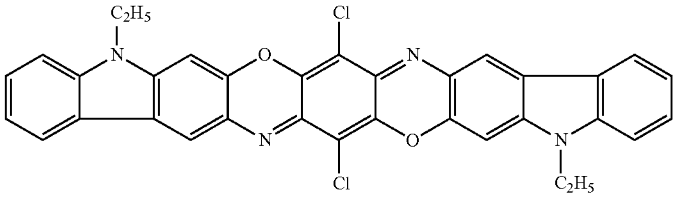
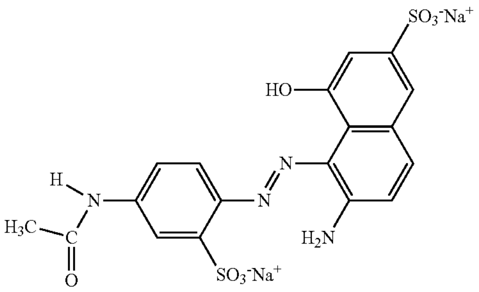
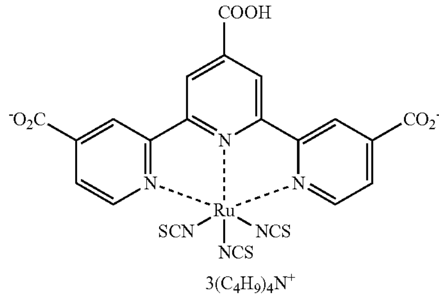
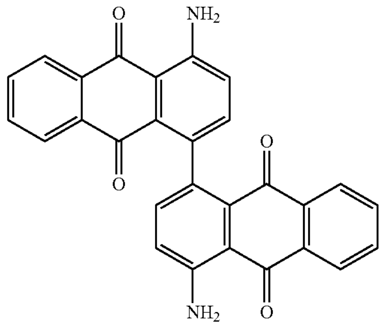
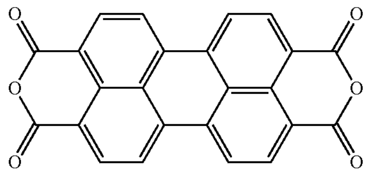
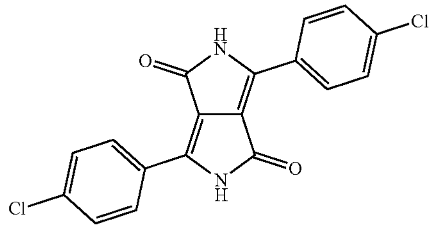
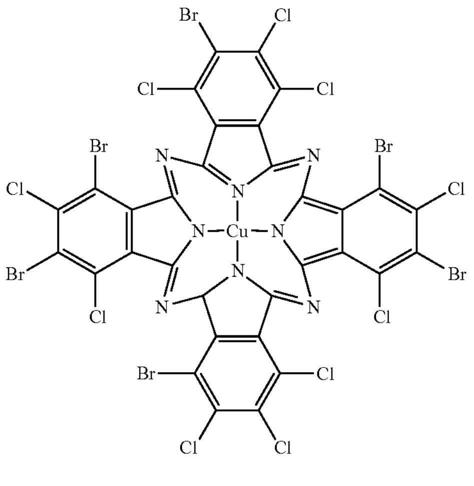

-continued
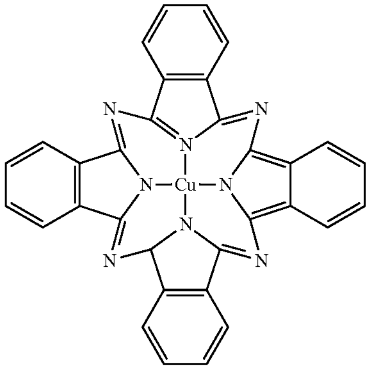
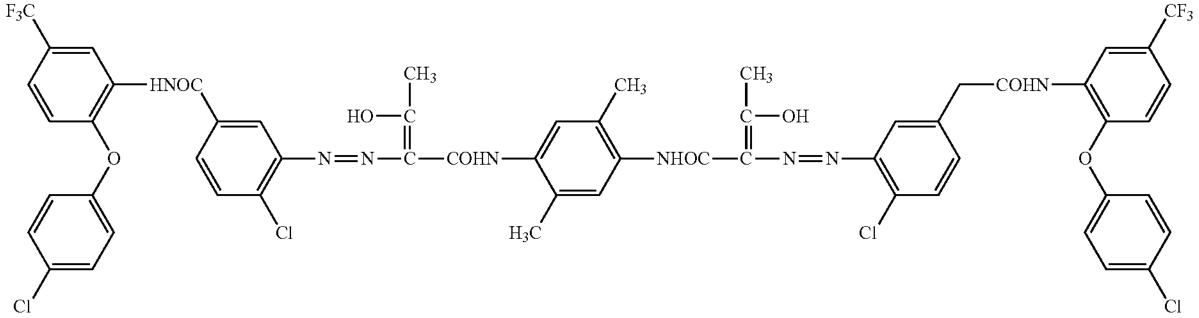
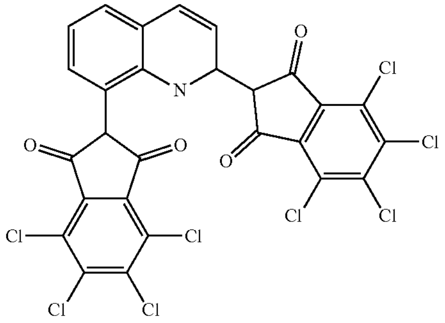
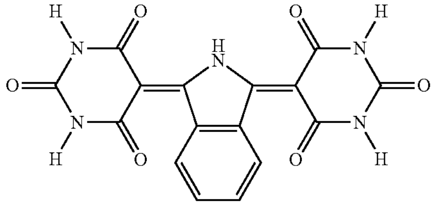
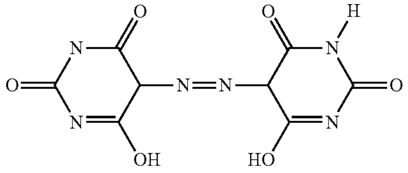
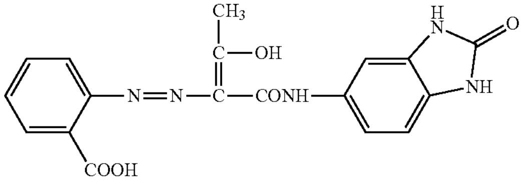
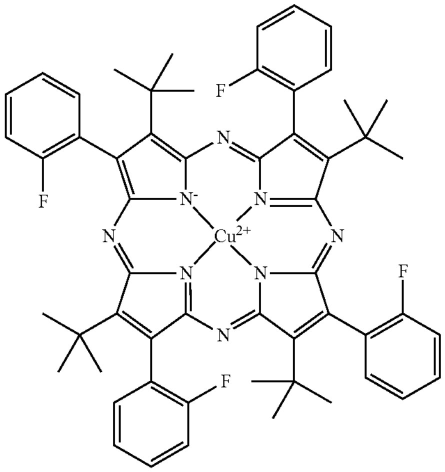
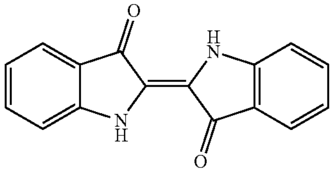

-continued
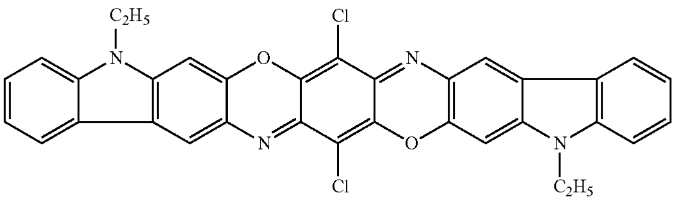
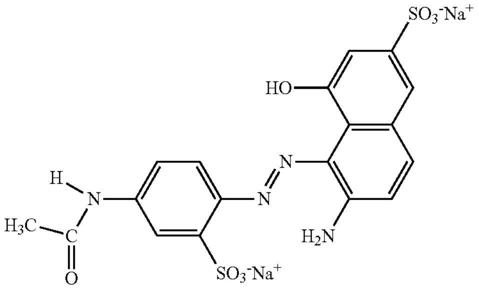
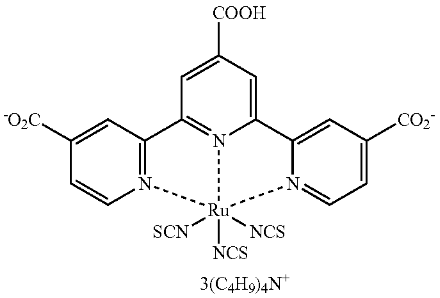
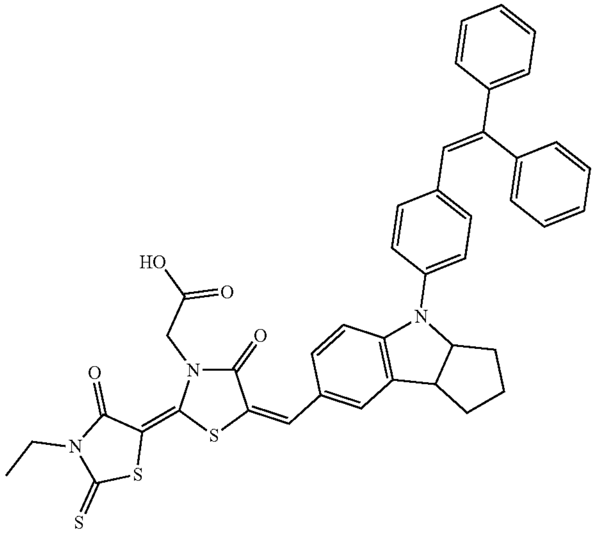
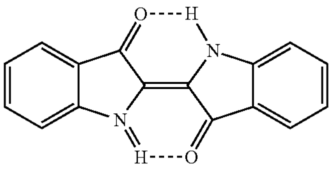
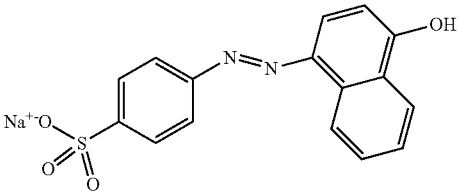
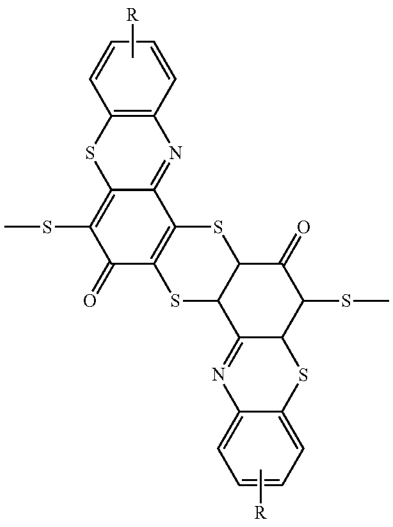

-continued

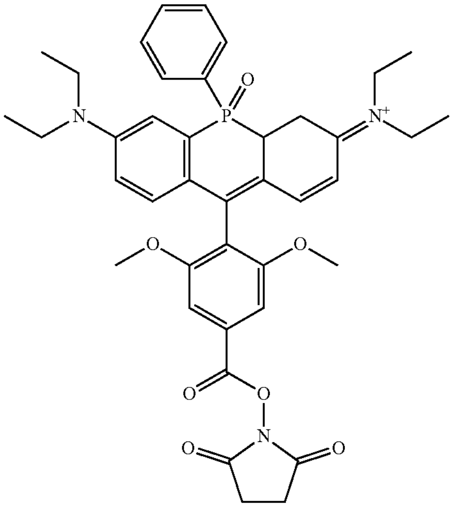

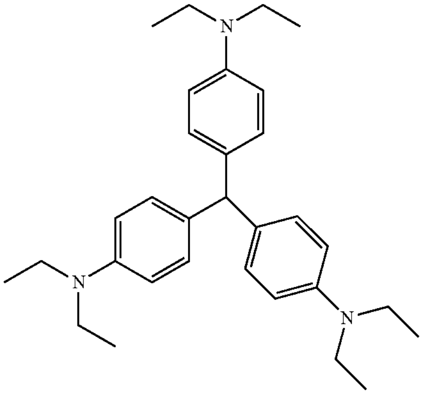

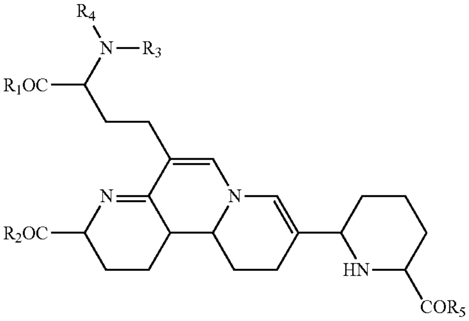

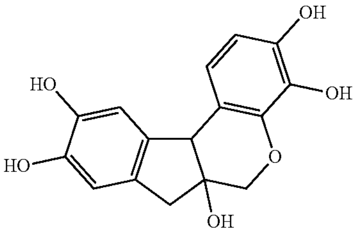

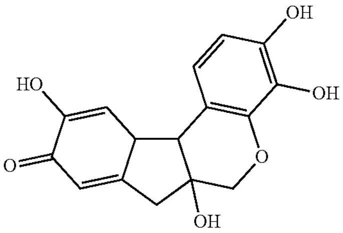

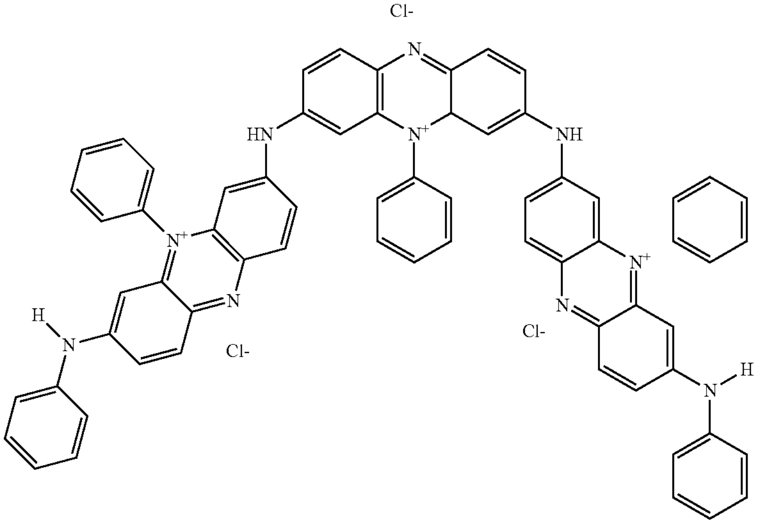

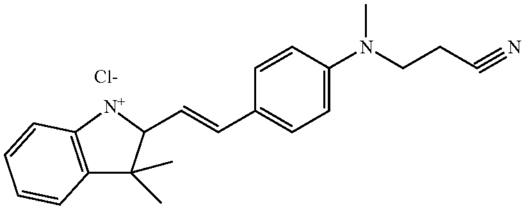

In Compound Group 1 above, R, $R_1$, $R_2$, $R_3$, $R_4$, and $R_5$ may be each independently a hydrogen atom, a deuterium atom, a halogen atom, an isocyanate group, a cyano group, a nitro group, a nitrile group, a substituted or unsubstituted amine group, a substituted or unsubstituted oxy group, a substituted or unsubstituted thio group, a substituted or unsubstituted alkyl group having 1 to 12 carbon atoms, a substituted or unsubstituted heterocycloalkyl group having 2 to 12 carbon atoms, a substituted or unsubstituted alkenyl group having 2 to 12 carbon atoms, a substituted or unsubstituted aryl group having 6 to 12 ring-forming carbon atoms, or a substituted or unsubstituted heteroaryl group having 2 to 12 ring-forming carbon atoms.

The overcoating layer OC may include any one light absorber AP in Compound Group 1, thereby absorbing the scattered light caused by the scatterer SP included in the light control layer CCL and absorbing the external light reflected on the surface of the light control layer CCL. Accordingly, the display module DM of an embodiment may have a decrease in reflectance, prevent a decrease in the bright room contrast ratio ("BRCR") of the display device DD, and have an improvement in visibility.

In an embodiment, the overcoating layer OC may include a polymer resin OC-BR having high strength and high planarization properties. Accordingly, the overcoating layer OC may provide a planarized top surface with high hardness. The polymer resin OC-BR included in the overcoating layer OC may include at least one of the first polymer resin or the second polymer resin.

The first polymer resin may be poly silsesquioxane. The first polymer resin of the poly silsesquioxane may include at least one among repeating units represented by Formula A to Formula D below. Formula A may correspond to a first repeating unit, Formula B may correspond to a second repeating unit, Formula C may correspond to a third repeating unit, and Formula D may correspond to a fourth repeating unit. The first polymer resin may include at least one among the first repeating unit to the fourth repeating unit. The first polymer resin may include at least two among the first repeating unit to the fourth repeating unit.

[Formula A]

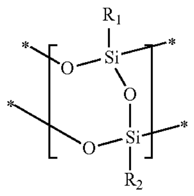

[Formula B]

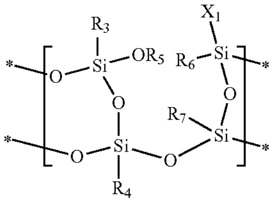

[Formula C]

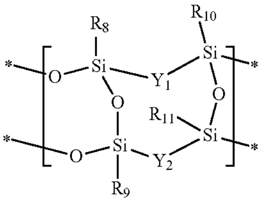

[Formula D]

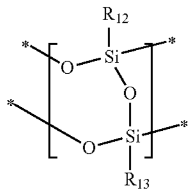

In Formula A to Formula D above, $R_1$ to $R_{13}$ may be each independently a hydrogen atom, a deuterium atom, a halogen atom, an isocyanate group, a cyano group, a nitro group, a nitrile group, a substituted or unsubstituted amine group, a substituted or unsubstituted oxy group, a substituted or unsubstituted thio group, a substituted or unsubstituted alkyl group having 1 to 12 carbon atoms, a substituted or unsubstituted heterocycloalkyl group having 2 to 12 carbon atoms, a substituted or unsubstituted alkenyl group having 2 to 12 carbon atoms, a substituted or unsubstituted aryl group having 6 to 12 ring-forming carbon atoms, or a substituted or unsubstituted heteroaryl group having 2 to 12 ring-forming carbon atoms. In Formula A to Formula D, "——*" refers to a linked position.

In Formula B, $X_1$ may be $(SiO_{3/2}R_{a1})_{4+2m}O$ or $R_{a2}$, and m may be an integer of 1 to 20. In Formula C, at least one of $Y_1$ or $Y_2$ may be $(SiO_{3/2}R_{a3})_{4+2n}O$, and the rest of $Y_1$ and $Y_2$ may be O or $NR_{a4}$. In Formula C, both $Y_1$ and $Y_2$ may be $(SiO_{3/2}R_{a3})_{4+2n}O$. In another embodiment, any one of $Y_1$ and $Y_2$ may be $(SiO_{3/2}R_{a3})_{4+2n}O$, and the rest of $Y_1$ and $Y_2$ may be O or $NR_{a4}$. n may be an integer of 1 to 20. In an embodiment, $R_{a1}$ to $R_{a4}$ may be each independently a substituted or unsubstituted alkyl group having 1 to 12 carbon atoms.

In the present specification, the term "substituted or unsubstituted" may indicate that one is unsubstituted or substituted with at least one substituent selected from the group consisting of a deuterium atom, a halogen atom, a cyano group, a nitro group, a nitrile group, an amine group, a silyl group, a boron group, a phosphine oxide group, a phosphine sulfide group, an alkyl group, an alkenyl group, an aryl group, and a heterocyclic group. In addition, each of the substituents exemplified above may be substituted or unsubstituted. For example, a biphenyl group may be interpreted as an aryl group or a phenyl group substituted with a phenyl group.

In the specification, examples of the halogen atom may include a fluorine atom, a chlorine atom, a bromine atom, or an iodine atom.

In the specification, the alkyl group may be a linear, branched or cyclic type. The number of carbons in the alkyl group is 1 to 50, 1 to 30, 1 to 20, 1 to 10, or 1 to 6. Examples of the alkyl group may include, but are not limited to, methyl group, ethyl group, n-propyl group, isopropyl group, n-butyl group, s-butyl group, t-butyl group, i-butyl group, 2-ethylbutyl group, 3,3-dimethylbutyl group, n-pentyl group, i-pentyl group, neopentyl group, t-pentyl group, cyclopentyl group, 1-methylpentyl group, 3-methylpentyl group, 2-ethylpentyl group, 4-methyl-2-pentyl group, n-hexyl group, 1-methylhexyl group, 2-ethylhexyl group, 2-butylhexyl group, cyclohexyl group, 4-methylcyclohexyl group, 4-t-butylcyclohexyl group, n-heptyl group, 1-methylheptyl group, 2,2-dimethylheptyl group, 2-ethylheptyl group, 2-butylheptyl group, n-octyl group, t-octyl group, 2-ethyloctyl group, 2-butyloctyl group, 2-hexyloctyl group, 3,7-dimethyloctyl group, cyclooctyl group, n-nonyl group, n-decyl group, adamantyl group, 2-ethyldecyl group, 2-butyldecyl group, 2-hexyldecyl group, 2-octyldecyl group, n-undecyl group, n-dodecyl group, 2-ethyldodecyl group, 2-butyldodecyl group, 2-hexyldocecyl group, 2-octyldodecyl group, n-tridecyl group, n-tetradecyl group, n-pentadecyl group, n-hexadecyl group, 2-ethylhexadecyl group, 2-butylhexadecyl group, 2-hexylhexadecyl group, 2-octylhexadecyl group, n-heptadecyl group, n-octadecyl group, n-nonadecyl group, n-eicosyl group, 2-ethyleicosyl group, 2-butyleicosyl group, 2-hexyleicosyl group, 2-octyleicosyl group, n-henicosyl group, n-docosyl group, n-tricosyl group, n-tetracosyl group, n-pentacosyl group, n-hexacosyl group, n-heptacosyl group, n-octacosyl group, n-nonacosyl group, n-triacontyl group, etc.

In the specification, the alkenyl group may be linear or branched. The number of carbon atoms in the alkenyl group is not specifically limited, but is 2 to 30, 2 to 20, or 2 to 12. Examples of the alkenyl group include a vinyl group, a 1-butenyl group, a 1-pentenyl group, a 1,3-butadienyl aryl group, a styrenyl group, a styryl vinyl group, etc., but the embodiment of the invention is not limited thereto.

In the specification, an aryl group means any functional group or substituent derived from an aromatic hydrocarbon ring. The aryl group may be a monocyclic aryl group or a polycyclic aryl group. The number of ring-forming carbon atoms in the aryl group may be 6 to 30, 6 to 20, 6 to 15, or 6 to 12. Examples of the aryl group may include a phenyl group, a naphthyl group, a fluorenyl group, an anthracenyl group, a phenanthryl group, a biphenyl group, a terphenyl group, a quaterphenyl group, a quinqphenyl group, a sexiphenyl group, a triphenylenyl group, a pyrenyl group, a benzofluoranthenyl group, a chrysenyl group, etc., but the embodiment of the invention is not limited thereto.

In the description, the heteroaryl group may include at least one of O, N, P, Si, or S as a heteroatom. The number of ring-forming carbon atoms in the heteroaryl group may be 2 to 30, 2 to 20, or 2 to 12. The heteroaryl group may be a monocyclic heteroaryl group or a polycyclic heteroaryl group. The polycyclic heteroaryl group may have, for example, a bicyclic or tricyclic structure. Examples of the heteroaryl group may include, but are not limited to, a thiophene group, a furan group, a pyrrole group, an imidazole group, a thiazole group, an oxazole group, an oxadiazole group, a triazole group, a pyridyl group, a bipyridyl group, a pyrimidyl group, a triazine group, a triazole group, an acridyl group, a pyridazine group, a pyrazinyl group, a quinolinyl group, a quinazoline group, a quinoxalinyl group, a phenothiazyl group, a phthalazinyl group, a pyrido pyrimidinyl group, a pyrido pyrazinyl group, a pyrazino pyrazinyl group, an isoquinoline group, an indole group, a carbazole group, an N-arylcarbazole group, an N-heteroarylcarbazole group, an N-alkylcarbazole group, a benzoxazole group, a benzoimidazole group, a benzothiazole group, a benzocarbazole group, a benzothiophene group, a dibenzothiophenyl group, a thienothiophene group, a benzofuranyl group, a phenanthroline group, a thiazolyl group, an isoxazolyl group, an oxadiazolyl group, a thiadiazolyl group, a benzothiazolyl group, a phenothiazine group, a dibenzosilole group, a dibenzofuran group, etc.

In the specification, the heterocycloalkyl group may contain at least one of B, O, N, P, Si or S as a heteroatom. The number of ring-forming carbon atoms in the heterocycloalkyl group may be 2 to 30, 2 to 20, or 2 to 12. Examples of the heterocycloalkyl group include an oxirane group, a tyran group, a pyrrolidine group, a piperidine group, a tetrahydrofuran group, a tetrahydrothiophene group, a thian group, a tetrahydropyran group, a 1,4-dioxane group, etc., but the embodiment of the invention is not limited thereto.

In the specification, the thio group may include an alkylthio group and an arylthio group. The thio group may mean that a sulfur atom is bonded to the alkyl group or the aryl group as defined above. Examples of the thio group may include a methylthio group, an ethylthio group, a propylthio group, a pentylthio group, a hexylthio group, an octylthio group, a dodecylthio group, a cyclopentylthio group, a cyclohexylthio group, a phenylthio group, a naphthylthio group, but the embodiment of the invention is not limited thereto.

In the specification, an oxy group may mean that an oxygen atom is bonded to the alkyl group or the aryl group as defined above. The oxy group may include an alkoxy group and an aryl oxy group. The alkoxy group may be a linear chain, a branched chain or a ring chain. The number of carbon atoms in the alkoxy group is not specifically limited, but may be, for example, 1 to 40, 1 to 20 or 1 to 10. Examples of the oxy group may include methoxy, ethoxy, n-propoxy, isopropoxy, butoxy, pentyloxy, hexyloxy, octyloxy, nonyloxy, decyloxy, benzyloxy, etc., but the embodiment of the invention is not limited thereto.

In the specification, the number of carbon atoms in an amine group is not specifically limited, but may be 1 to 30. The amine group may include an alkyl amine group and an aryl amine group. Examples of the amine group include a methylamine group, a dimethylamine group, a phenylamine group, a diphenylamine group, a naphthylamine group, a 9-methyl-anthracenylamine group, etc., but the embodiment of the invention is not limited thereto.

In an embodiment, the overcoating layer OC may include at least two among the first repeating unit to the fourth repeating unit. For example, the overcoating layer OC may include the first polymer resin represented by any one among Formula 1 to Formula 9 below. In Formula 1 to Formula 9, the number of the first repeating unit to the fourth repeating unit may be singular or plural, respectively. For example, two first repeating units and one third repeating unit may be included. The first repeating units may be bonded to both sides of a linking group of the third repeating unit. A substituent may be bonded to a linking group of the first repeating unit located at an edge. The substituent bonded to the repeating unit is not limited to any one embodiment. This is exemplary, and the number and kinds of the repeating units included in the first polymer resin is not limited thereto.

In an embodiment, Formula 1 may include the first repeating unit and the third repeating unit. Formula 2 may include one first repeating unit and two third repeating units, and each third repeating unit may be linked to both sides of the linking group of the first repeating unit. Formula 3 may include the first repeating unit, the third repeating unit, and the fourth repeating unit, and the third repeating unit and the fourth repeating unit may be linked to both sides of the linking group of the first repeating unit. Formula 4 may include the first repeating unit, the second repeating unit, and the third repeating unit, and the first repeating unit and the third repeating unit may be linked to both sides of the linking group of the second repeating unit.

Formula 5 to Formula 7 may include four repeating units. Formula 5 may include one first repeating unit, one second repeating unit, and two third repeating units, and the third repeating unit, the first repeating unit, the second repeating unit, and the third repeating unit may be sequentially linked. Formula 6 may include one first repeating unit, second repeating unit, third repeating unit, and fourth repeating unit. In Formula 6, the fourth repeating unit, the first repeating unit, the second repeating unit, and the third repeating unit may be sequentially linked. Formula 7 may include two first repeating units, one second repeating unit, and one third repeating unit, and the first repeating unit, the second repeating unit, the first repeating unit, and the third repeating unit may be sequentially linked.

Formula 8 and Formula 9 each may include five repeating units. Formula 8 may include two first repeating units, one second repeating unit, and two third repeating units, and the third repeating unit, the first repeating unit, the second repeating unit, the first repeating unit, and the third repeating unit may be sequentially linked. Formula 9 may include two first repeating units, one second repeating unit, one third repeating unit, and one fourth repeating unit, and the fourth repeating unit, the first repeating unit, the second repeating unit, the first repeating unit, and the third repeating unit may be sequentially linked.

[Formula 1]
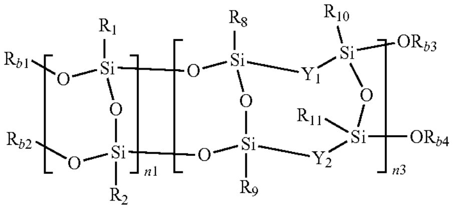
[Formula 2]
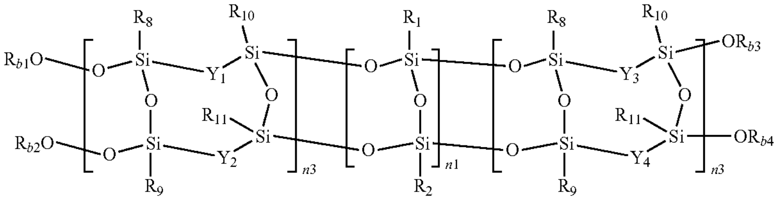
[Formula 3]
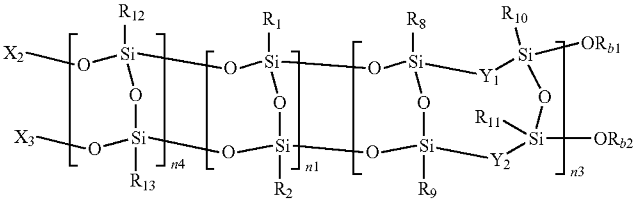
[Formula 4]
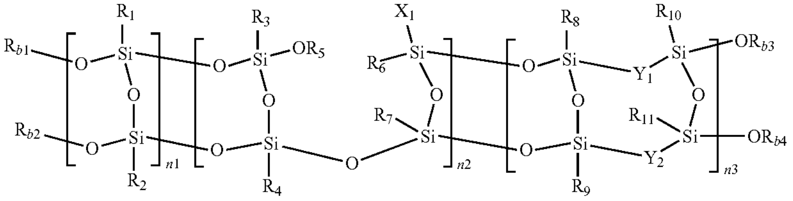
[Formula 5]
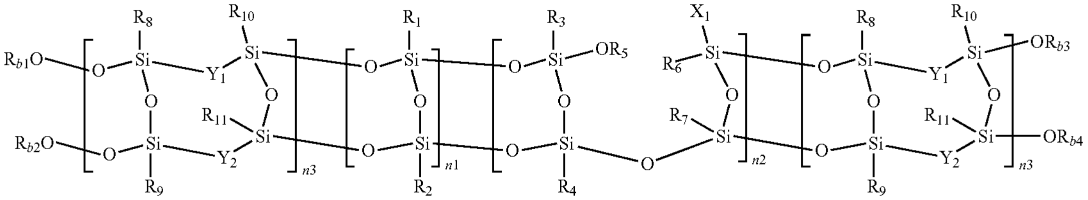
[Formula 6]
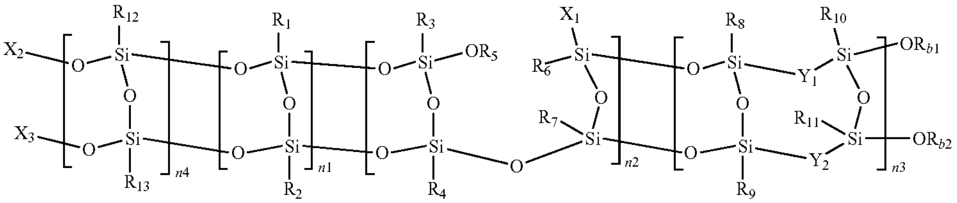
[Formula 7]
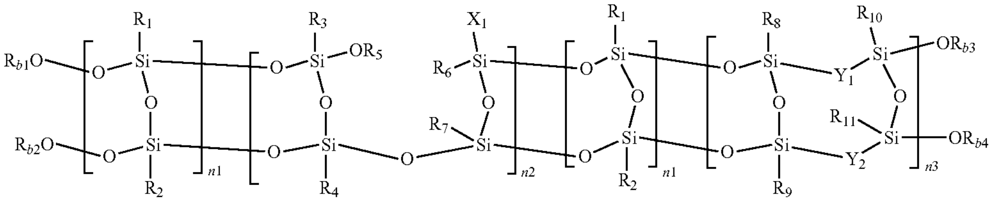

-continued

[Formula 8]

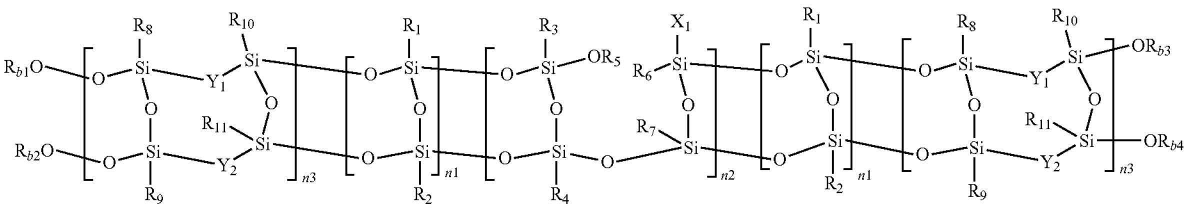

[Formula 9]

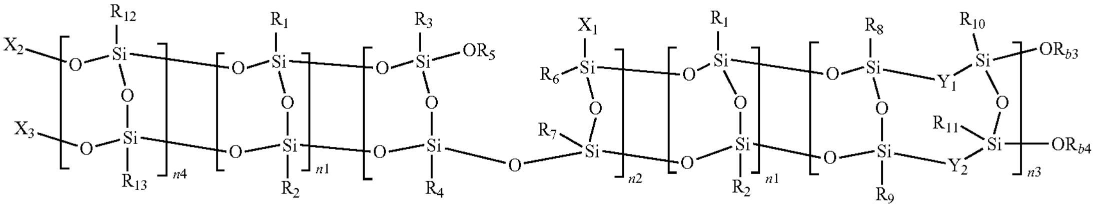

In Formula 1 to Formula 9, the same as described in Formula A to Formula D above may be applied to $R_1$ to $R_{13}$, $Y_1$ and $Y_2$. For example, $R_1$ to $R_{13}$ may be each independently a hydrogen atom, a deuterium atom, a halogen atom, an isocyanate group, a cyano group, a nitro group, a nitrile group, a substituted or unsubstituted amine group, a substituted or unsubstituted oxy group, a substituted or unsubstituted thio group, a substituted or unsubstituted alkyl group having 1 to 12 carbon atoms, a substituted or unsubstituted heterocycloalkyl group having 2 to 12 carbon atoms, a substituted or unsubstituted alkenyl group having 2 to 12 carbon atoms, a substituted or unsubstituted aryl group having 6 to 12 ring-forming carbon atoms, or a substituted or unsubstituted heteroaryl group having 2 to 12 ring-forming carbon atoms. In Formula 1 to Formula 9, when each of $R_1$ to $R_{13}$ is provided in plural, a plurality of $R_1$ to $R_{13}$ may each be the same or different.

In Formula 1 to Formula 9, n1 and n3 may be each independently an integer of 1 to 100,000. n2 may be an integer of 1 to 500, and n4 may be 1 or 2. In Formula 1 to Formula 9, when each of the first to fourth repeating units is provided in plural, a plurality of n1 to n4 may each be the same or different.

In Formula 1 to Formula 9, at least one among $X_1$ to $X_3$ may be $(SiO_{3/2}R_{c1})_{4+2k}O$, and the rest of $X_1$ to $X_3$ may be $R_{c2}$. For example, all of $X_1$ to $X_3$ may be $(SiO_{3/2}R_{c1})_{4+2k}O$. In addition, $X_1$ may be $(SiO_{3/2}R_{c1})_{4+2k}O$, and $X_2$ and $X_3$ may be $R_{c2}$. $X_2$ and $X_3$ may be the same as or different from each other. $X_2$ may be $(SiO_{3/2}R_{c1})_{4+2k}O$, and $X_1$ and $X_3$ may be $R_{c2}$. $X_1$ and $X_3$ may be the same as or different from each other. $X_3$ may be $(SiO_{3/2}R_{c1})_{4+2k}O$, and $X_1$ and $X_2$ may be $R_{a2}$. $X_1$ and $X_2$ may be the same as or different from each other. k may be an integer of 1 to 20.

In Formula 1 to Formula 9, at least one of $Y_1$ or $Y_2$ may be $(SiO_{3/2}R_{a3})_{4+2n}O$, and the rest of $Y_1$ and $Y_2$ may be O or $NR_{a4}$. n may be an integer of 1 to 20. $R_{c1}$, $R_{c2}$, $R_{a3}$, $R_{a4}$ and $R_{b1}$ to $R_{b4}$ may be each independently a substituted or unsubstituted alkyl group having 1 to 12 carbon atoms.

In an embodiment, the second polymer resin may be represented by any one among Formula 10 to Formula 14 below:

[Formula 10]

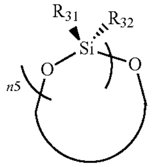

[Formula 11]

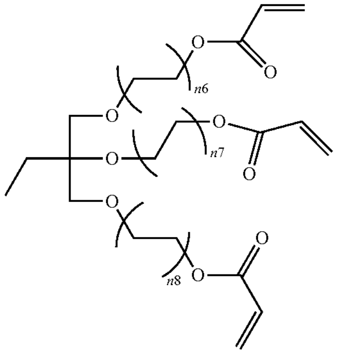

[Formula 12]

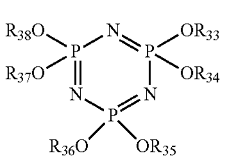

[Formula 13]

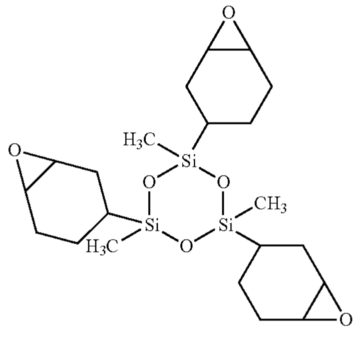

-continued

[Formula 14]

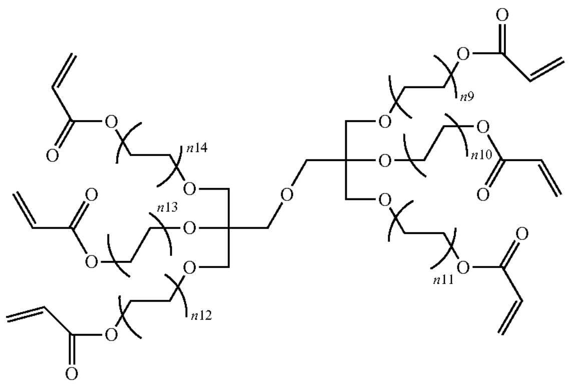

In Formula 10 to Formula 14, n5 may be an integer of 1 to 20, n6 to n8 may be each independently an integer of 1 to 5, and n9 to n14 may be each independently an integer of 1 to 12. $R_{31}$ to $R_{38}$ may be represented by R-1 or R-2 below:

R-1

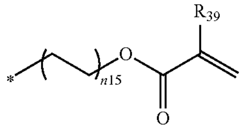

R-2

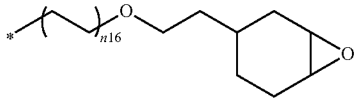

In R-1 and R-2 above, n15 and n16 may be each independently an integer of 1 to 12. $R_{39}$ may be a hydrogen atom, or a methyl group. In R-1 and R-2 above, "——*" refers to a linked position.

The overcoating layer OC may include the polymer resin OC-BR represented by any one among Formula 1 to Formula 14, thereby exhibiting a high hardness characteristic. For example, the overcoating OC may have a hardness of about 0.4 gigapascals (GPa) to about 0.9 GPa. Accordingly, the display module DM including the overcoating layer OC may be prevented from being damaged by external friction.

The reflection preventing layer ARL may be disposed on the overcoating layer OC. The overcoating layer OC, which provides a base surface on which the reflection preventing layer ARL of an embodiment is disposed, may have a thickness relatively thicker than each layer included in the reflection preventing layer ARL. The overcoating layer OC may have a thickness of about 3 micrometers (μm) to about 15 μm, or about 3 μm to about 12 μm. The overcoating layer OC may include about 6 percentages by weight (wt %) to about 20 wt % of the light absorber AP with respect to the total weight of a composition for forming an overcoating layer. The display modules DM and DM-1 of embodiments may reduce the reflectance of the display modules DM and DM-1 by adjusting the content of the light absorber AP included in the overcoating layer OC and/or the thickness of the overcoating layer OC. The composition for forming an overcoating layer may include the light absorber AP, and a polymer resin including at least one of the first polymer resin or the second polymer resin, and may further include a solvent. The solvent may be used without particular limitation as long as it can be used in the art.

The overcoating layer OC may have a refractive index lower than a first layer IL1 (see FIG. 5A) and a second layer IL2 (see FIG. 5A) included in the reflection preventing layer ARL. The overcoating layer OC may have a refractive index of about 1.45 to about 1.53.

The anti-reflection layer ARL may be in contact with the upper surface of the overcoating layer OC. The reflection preventing layer ARL may include a plurality of layers having a low reflectance and blocking external light. The reflection preventing layer ARL may include a plurality of layers having different refractive indices and may effectively block external light through destructive interference. The reflectance on the upper surface of the reflection preventing layer ARL may be 2% or less. In the visible light range of about 410 nm to about 750 nm, reflectance on the upper surface of the reflection preventing layer ARL may be 2% or less. A plurality of layers included in the reflection preventing layer ARL of an embodiment will be described later.

Compared with the display module DM illustrated in FIG. 4A, the display module DM-1 according to an embodiment illustrated in FIG. 4B is an embodiment in which the color filter layer CFL is disposed with the bottom surface of the overcoating layer OC as a base surface. Hereinafter, in the description of the display module of an embodiment illustrated in FIG. 4B, the duplicated features which have been described in FIGS. 1 to 4A will not be described again, but their differences will be mainly described.

Referring to FIG. 4B, the color filter layer CFL according to an embodiment may be formed with the bottom surface of the overcoating layer OC as a base surface, and may have a shape in which the color filter layer CFL illustrated in FIG. 4A is inverted. In addition, in the color filter layer CFL, each of the light shielding part BM and the first to third filters CF1, CF2, and CF3 may have different shapes from the shapes illustrated in FIG. 4A. For example, at least one among the first to third filters CF1, CF2, and CF3 may be disposed in the non-light emitting region NPXA. The first filter CF1 may be provided in the red light emitting region PXA-R, the second filter CF2 may be provided in the green light emitting region PXA-G, and the third filter CF3 may be provided in the blue light emitting region PXA-B and the non-light emitting region NPXA.

Although not illustrated, an upper base layer which provides a reference surface may be disposed between the color filter layer CFL and the overcoating layer OC. The upper base layer may be a member which provides a base surface on which the color filter layer CFL is disposed under the overcoating layer OC. The upper base layer may be a glass substrate, a metal substrate, a plastic substrate, or the like. However, the embodiment of the invention is not limited thereto, and the upper base layer may be an inorganic layer, an organic layer, or a composite material layer in another embodiment. The upper base layer may be omitted.

Figure 5A:
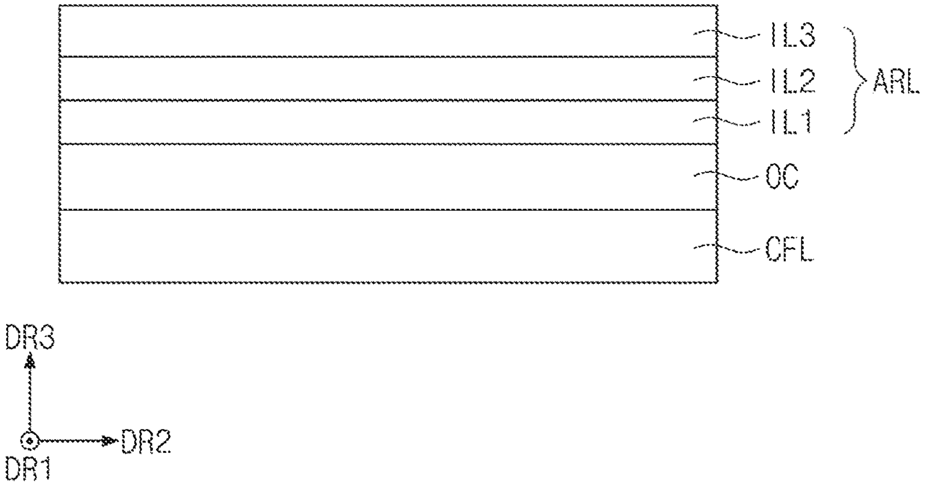
FIG. 5A is a cross-sectional view illustrating some components of a display module according to an embodiment of the invention.
Figure 5B:
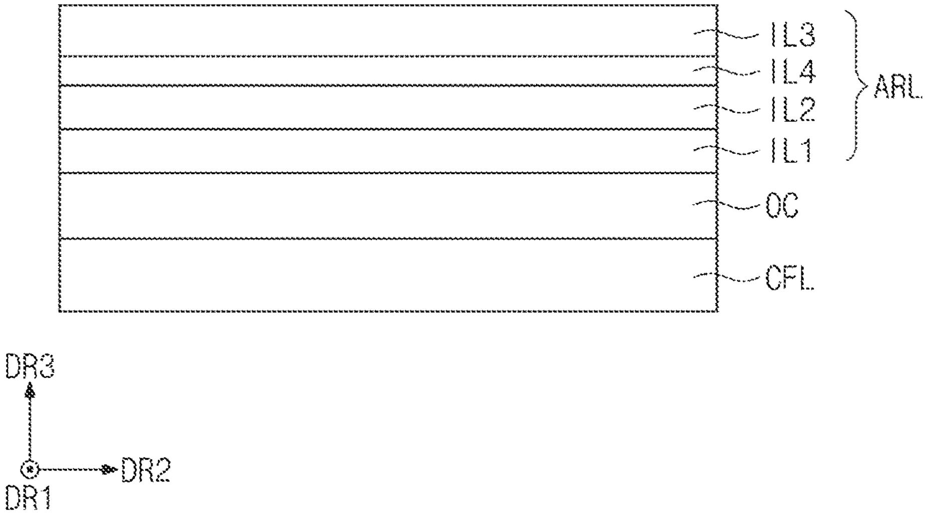
FIG. 5B is a cross-sectional view illustrating some components of a display module according to another embodiment of the invention.

FIGS. 5A and 5B are cross-sectional views illustrating some components of a display module according to an embodiment of the invention. FIGS. 5A and 5B schematically illustrate a structure in which a color filter layer CFL, an overcoating layer OC, and a reflection preventing layer ARL are stacked. In the description of some components of the display modules of embodiments illustrated in FIGS. 5A and 5B, duplicated features which have been described in FIGS. 1 to 4B will not be described again, but their differences will be mainly described.

Hereinafter, the reflection preventing layer ARL of the invention is described in more detail with reference to FIGS. 5A and 5B.

Referring to FIG. 5A, the reflection preventing layer ARL is disposed on the overcoating layer OC and includes a plurality of layers. The reflection preventing layer ARL includes a first layer IL1 disposed on the overcoating layer OC, a second layer IL2 disposed on the first layer IL1, and a third layer IL3 disposed on the second layer IL2. The first layer IL1 may be disposed to contact the upper surface of the overcoating layer OC, the second layer IL2 may be disposed to contact the upper surface of the first layer IL1, and the third layer IL3 may be disposed to contact the upper surface of the second layer IL2. Any separate layer may not be provided on the upper portion of the third layer IL3. That is, the third layer IL3 may be the outermost layer disposed on the uppermost portion of the reflection preventing layer ARL. The upper surface of the third layer IL3 may define the outermost surface of the reflection preventing layer ARL. The third layer IL3 may be the outermost layer of the display module DM.

The first layer IL1 may include silicon oxynitride (SiON). The first layer IL1 may be a layer composed of silicon oxynitride. The second layer IL2 may include silicon nitride (SiNx). The second layer IL2 may be a layer composed of silicon nitride.

The third layer IL3 may include polysilazane. The third layer IL3 may be a layer composed of polysilazane. The third layer IL3 may be a layer composed of polysilazane having, as a basic skeleton, a chain in which silicon and nitrogen atoms are alternately disposed.

The first layer IL1, the second layer IL2, and the third layer IL3 each may have different refractive indices. In an embodiment, the second layer IL2 may be a layer having a refractive index higher than the first layer IL1 and the third layer IL3. The third layer IL3 may be a layer having a refractive index lower than the first layer IL1 and the second layer IL2. In an embodiment, the first layer IL1 may have a refractive index of about 1.60 to about 1.69, the second layer IL2 may have a refractive index of about 1.70 to about 1.90, and the third layer IL3 may have a refractive index of about 1.23 to about 1.40. Since each of the first layer IL1, the second layer IL2, and the third layer IL3 included in the reflection preventing layer ARL has the refractive index within the above range, the reflection preventing layer ARL may effectively prevent external light from being reflected on the surface of the display module DM (see FIG. 4A) through destructive interference.

Each of the first layer IL1, the second layer IL2, and the third layer IL3 may have a thickness of about 50 nm to about 150 nm. In an embodiment, the first layer IL1 may have a thickness of about 60 nm to about 80 nm, the second layer IL2 may have a thickness of about 130 nm to about 150 nm, and the third layer IL3 may have a thickness of about 80 nm to about 110 nm. Since each of the first layer IL1, the second layer IL2, and the third layer IL3 included in the reflection preventing layer ARL has the thickness within the above range, the reflection preventing layer ARL may prevent external light from being reflected on the surface of the display module DM (see FIG. 4A), and the thickness of the reflection preventing layer ARL may become excessively thick, and thus it may be prevented that display efficiency is reduced or a tolerance between the reflection preventing layer ARL and the display panel DP is increased.

The reflection preventing layer ARL may have low reflectance and high surface hardness. The reflectance on the upper surface of the reflection preventing layer ARL may be 0.1% or less, and the surface hardness thereof may be about 3H or more. For example, the reflectance on the upper surface of the reflection preventing layer ARL may be about 0% to about 0.03%. The surface hardness of the upper surface of the reflection preventing layer ARL may be about 4H. Since the reflection preventing layer ARL includes the first layer IL1, the second layer IL2, and the third layer IL3 having different refractive indices, external light is effectively prevented from being reflected, and thus the reflectance on the upper surface of the display module DM (see FIG. 4A) may be low. In addition, the reflection preventing layer ARL may include the third layer IL3 including polysilazane as the uppermost layer and thus may have the high surface hardness.

FIG. 5B illustrates another embodiment in which the reflection preventing layer ARL further includes a fourth layer IL4 as compared with FIG. 5A. The features described with reference to FIG. 5A may be applied to the remaining components other than the fourth layer IL4 in FIG. 5B.

Referring to FIG. 5B, the reflection preventing layer ARL may include the fourth layer IL4 between the second layer IL2 and the third layer IL3. The reflection preventing layer ARL may include the first layer IL1 disposed on the overcoating layer OC, the second layer IL2 disposed on the first layer IL1, and the second layer IL3 disposed on the third layer IL2, and a fourth layer IL4 disposed between the second layer IL2 and the third layer IL3. The first layer IL1 may be disposed to contact the upper surface of the overcoating layer OC, the second layer IL2 may be disposed to contact the upper surface of the first layer IL1, the fourth layer IL4 may be disposed to contact the upper surface of the second layer IL2, and the third layer IL3 may be disposed to contact the upper surface of the fourth layer IL4.

In an embodiment, the fourth layer ILA may be a capping layer for protecting the first layer IL1 and the second layer IL2 disposed under the fourth layer IL4. The fourth layer ILA may serve to prevent the penetration of moisture and/or oxygen (hereinafter, referred to as "moisture/oxygen"). The fourth layer IL4 may be disposed on the first layer IL1 and the second layer IL2, which serve to dissipate external light due to destructive interference, to block the first layer IL1 and the second layer IL2 from being exposed to moisture/oxygen.

The fourth layer IL4 may have a thickness less than the thicknesses of the first to third layers IL1, IL2, and IL3 so as not to affect the blocking of external light due to destructive interference. For example, the thickness of the fourth layer IL4 may be about 20 nm to about 50 nm. This fourth layer IL4 may have a refractive index of about 1.45 to about 1.69. The fourth layer IL4 may include silicon oxynitride (SiON) or silicon nitride (SiNx). The fourth layer IL4 may be a layer composed of silicon oxynitride or silicon nitride.

In the display module of an embodiment, an overcoating layer provided on the display panel may include a light absorber that can absorb light in a visible light region (a wavelength region of about 410 nm to about 750 nm), thereby absorbing external light and scattered light. Accordingly, the display module of an embodiment may exhibit improved reflectance, and may contribute to improving the visibility of the display device.

In addition, in the display module according to an embodiment, the reflection preventing layer is directly formed on the upper surface of the overcoating layer through deposition or the like rather than in the form of a film, and the display module includes a plurality of layers having different refractive indices, thereby providing improved durability and visibility effects.

In the display module DM (see FIG. 4A) of an embodiment, the transmittance (T %) and the SCE decrease rate (%) depending on the content of the light absorber AP included in the overcoating layer OC and the thickness of the overcoating layer OC were measured and the results are shown in Table 1 below. In Table 1 below, the content of the light absorber is the weight (wt %) of the included light absorber with respect to the total weight (wt %) of the composition used to form the overcoating layer OC. The transmittance ("SCI") and reflectance (SCE) were measured with CM 3600D made by Konica Minolta, Inc.

TABLE 1

| | Content of light absorber | | | | | | | | |
|---|---|---|---|---|---|---|---|---|---|
| | 6% | | | 10% | | | 20% | | |
| | Thickness of overcoating layer | | | | | | | | |
| | 12 μm | 10 μm | 3 μm | 10 μm | 6 μm | 3 μm | 8 μm | 5 μm | 3 μm |
| Transmittance (T %) | 56% | 65% | 71% | 44% | 53% | 59% | 18% | 31% | 41% |
| SCE decrease rate (%) | 86% | 60% | 51% | 90% | 88% | 83% | — | — | 91% |

Referring to Table 1, the display module of an embodiment may exhibit improved reflection characteristics by applying the overcoating layer including the light absorber to absorb external light and scattered light by quantum dots and scatterers included in the light control layer. That is, the display module of an embodiment may achieve low reflection characteristics.

Specifically, it may be confirmed that the display module of an embodiment will have lower transmittance as the thickness of the overcoating layer increases. That is, it may be seen that in the display module of the embodiment, when the overcoating layer including the same amount of the light absorber is formed to have a thickness of 3 μm to 12 μm, the absorption rate of external light and scattered light becomes higher as the thickness increases, and thus the reflectance is reduced. Meanwhile, as the thickness of the overcoat layer decreases, the transmittance is increased by Beer-Lambert Raw, but the absorption of external light and scattered light may be reduced, thereby increasing the reflectance. The display module of an embodiment may secure appropriate transmittance and reflectance by adjusting the thickness of the overcoating layer and the content of the light absorber.

The display panel of an embodiment may provide an effect of reducing a reflectance because the overcoating layer including the light absorber is disposed on the light control layer to thus absorb external light and inner scattered light. In addition, the display panel of an embodiment may provide an effect of preventing external light from being reflected on the surface of the display module because the reflection preventing layer is disposed on the overcoating layer.

The display device of an embodiment includes the above-described display module, and thus may prevent a decrease in a bright room contrast ratio, and provide improved visibility.

Although the invention has been described with reference to a preferred embodiment of the invention, it will be understood that the invention should not be limited to these preferred embodiments but various changes and modifications can be made by those skilled in the art without departing from the spirit and scope of the invention.

Accordingly, the technical scope of the invention is not intended to be limited to the contents set forth in the detailed description of the specification, but is intended to be defined by the appended claims.

What is claimed is:

1. A display module comprising:

a display panel;

a light control layer which is disposed directly on the display panel and comprises quantum dots and scatterers;

a color filter layer disposed on the light control layer;

an overcoating layer disposed on the color filter layer; and a reflection preventing layer disposed on the overcoating layer, wherein the overcoating layer comprises a light absorber which absorbs light in a wavelength region of about 410 nanometers (nm) to about 750 nm, and wherein the light absorber is represented by any one in Compound Group 1 below:

[Compound Group 1]

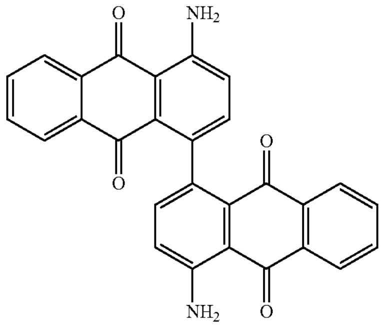

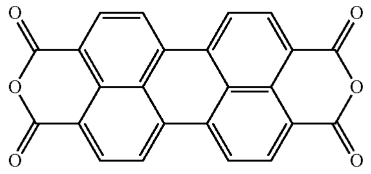

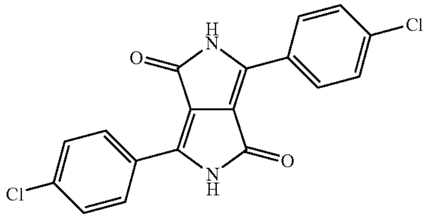

-continued
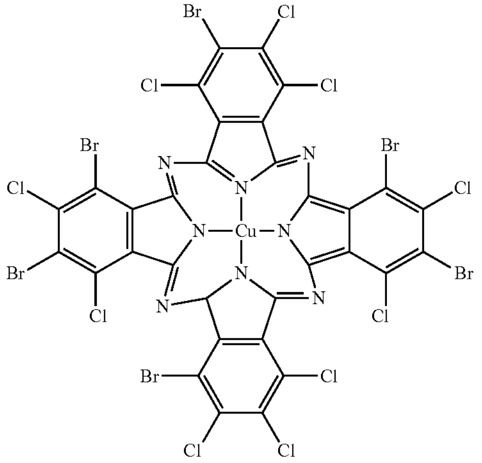
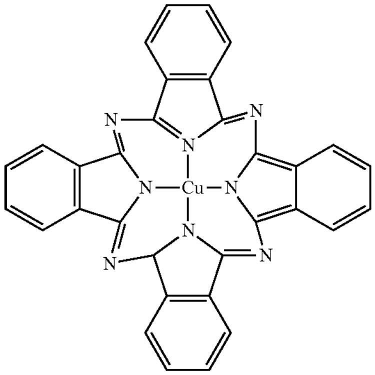
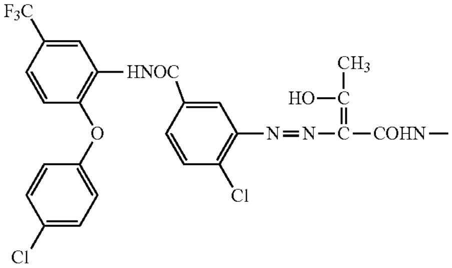
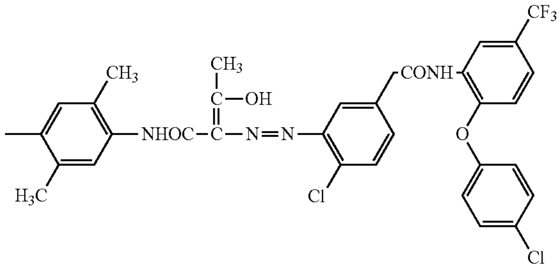
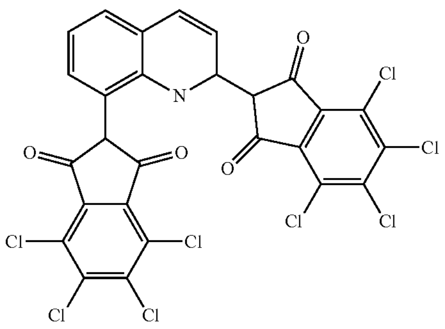
-continued
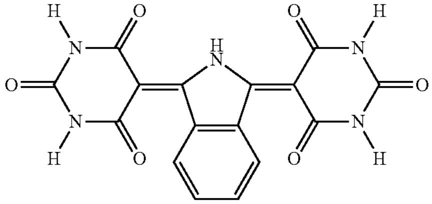
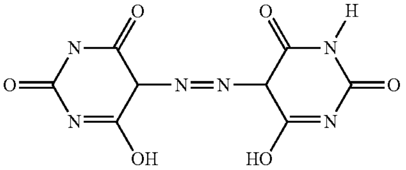
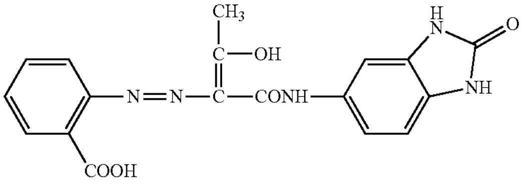
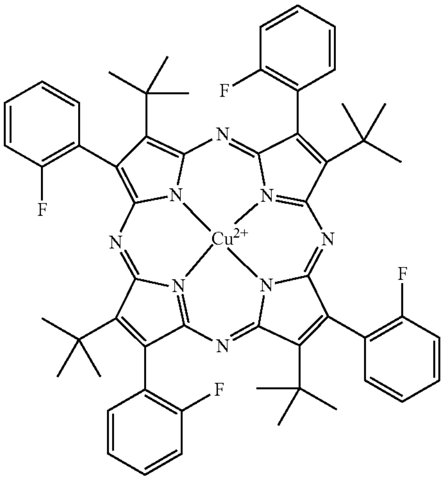
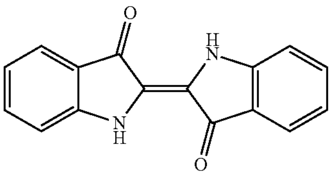
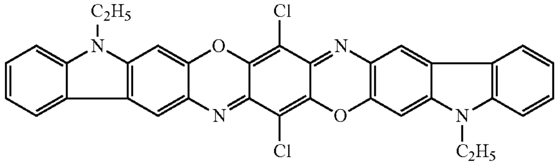
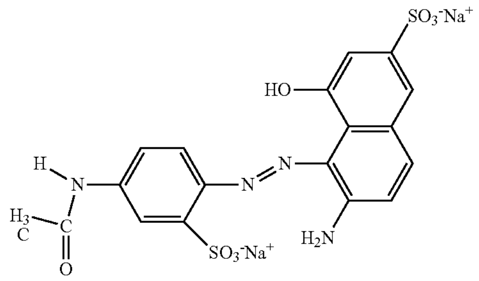

-continued
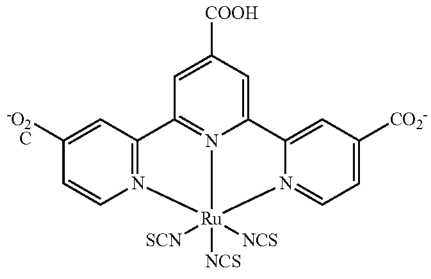
$3(C_4H_9)_4N^+$
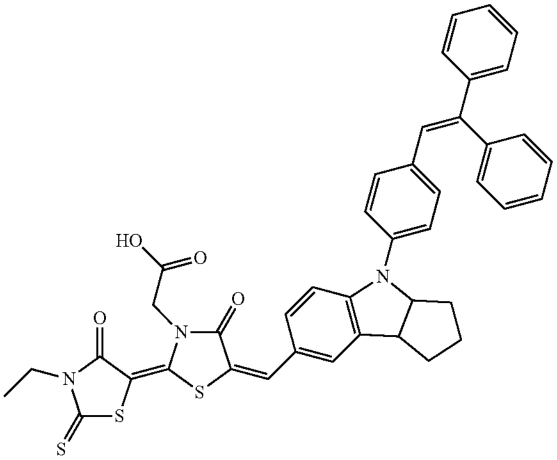
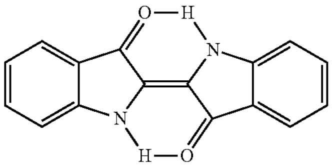
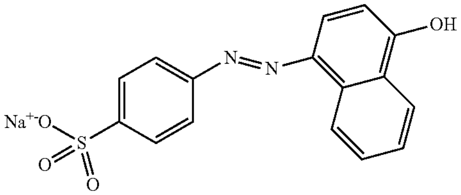
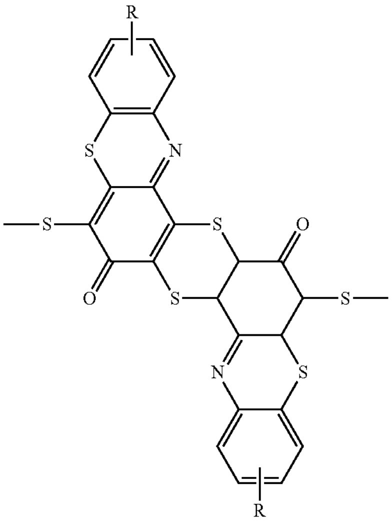
-continued
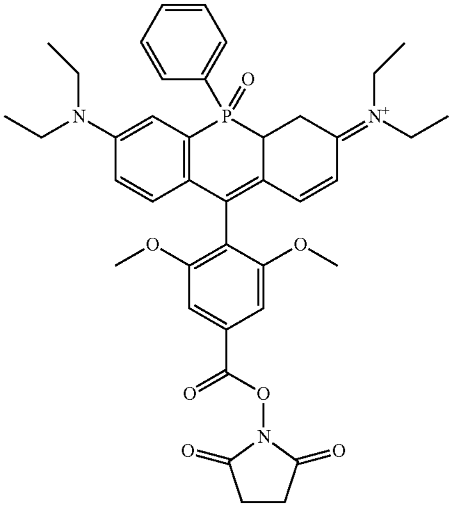
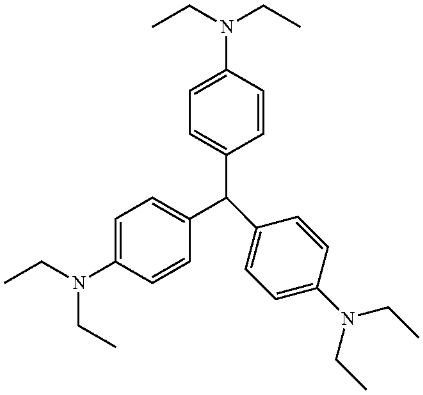
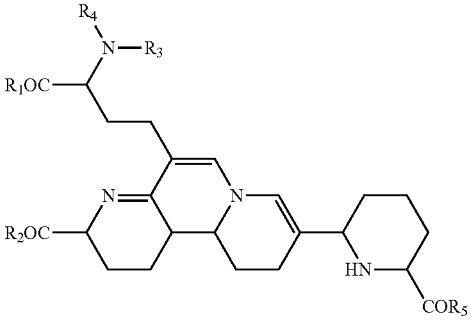
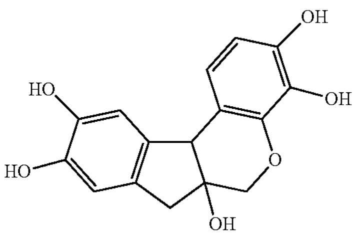
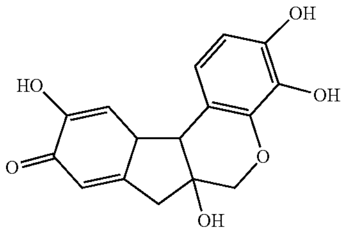

-continued

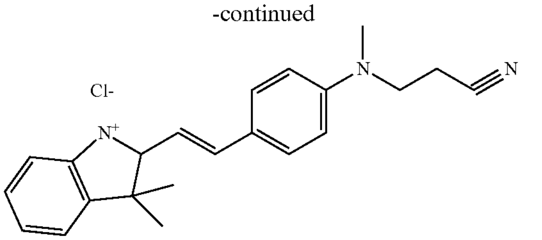

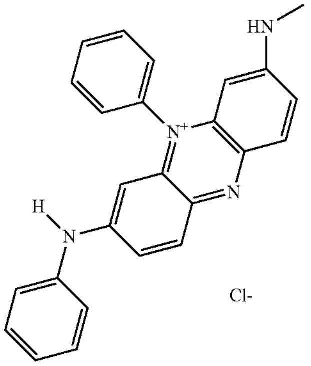

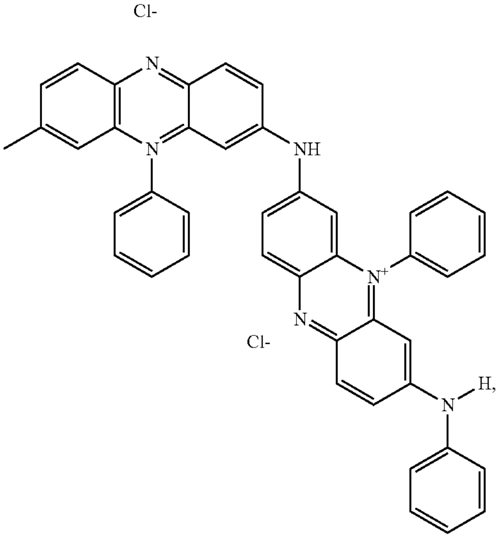

wherein, in Compound Group 1 above, R, $R_1$, $R_2$, $R_3$, $R_4$, and $R_5$ are each independently a hydrogen atom, a deuterium atom, a halogen atom, an isocyanate group, a cyano group, a nitro group, a nitrile group, a substituted or unsubstituted amine group, a substituted or unsubstituted oxy group, a substituted or unsubstituted thio group, a substituted or unsubstituted alkyl group having 1 to 12 carbon atoms, a substituted or unsubstituted heterocycloalkyl group having 2 to 12 carbon atoms, a substituted or unsubstituted alkenyl group having 2 to 12 carbon atoms, a substituted or unsubstituted aryl group having 6 to 12 ring-forming carbon atoms, or a substituted or unsubstituted heteroaryl group having 2 to 12 ring-forming carbon atoms.

2. The display module of claim 1, wherein the overcoating layer has a thickness of about 3 micrometers (μm) to about 15 μm.

3. The display module of claim 1, wherein the overcoating layer has a refractive index of about 1.45 to about 1.53.

4. The display module of claim 1, wherein the overcoating layer is formed of an overcoating layer-forming composition containing the light absorber, and the light absorber contained in the overcoating layer-forming composition is contained in an amount of about 6 percentages by weight (wt %) to about 20 wt % with respect to the total weight of the overcoating layer-forming composition.

5. The display module of claim 1, wherein the overcoating layer further comprises a polymer resin including at least one of a first polymer resin or a second polymer resin.

6. The display module of claim 5, wherein the first polymer resin comprises at least one among repeating units represented by Formula A to Formula D below:

[Formula A]

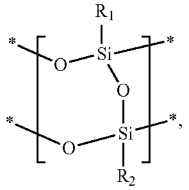

[Formula B]

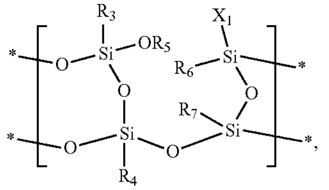

[Formula C]

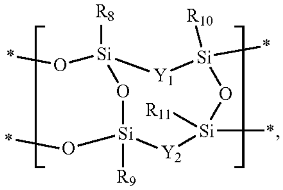

and

[Formula D]

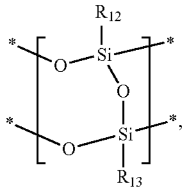

wherein, in Formula A to Formula D above, $R_1$ to $R_{13}$ are each independently a hydrogen atom, a deuterium atom, a halogen atom, an isocyanate group, a cyano group, a nitro group, a nitrile group, a substituted or unsubstituted amine group, a substituted or unsubstituted oxy group, a substituted or unsubstituted thio group, a substituted or unsubstituted alkyl group having 1 to 12 carbon atoms, a substituted or unsubstituted heterocycloalkyl group having 2 to 12 carbon atoms, a substituted or unsubstituted alkenyl group having 2 to 12 carbon atoms, a substituted or unsubstituted aryl group having 6 to 12 ring-forming carbon atoms, or a substituted or unsubstituted heteroaryl group having 2 to 12 ring-forming carbon atoms, $X_1$ is $(SiO_{3/2}Ra_1)_{4+2m}O$ or $R_{a2}$, and m is an integer of 1 to 20, at least one of $Y_1$ or $Y_2$ is $(SiO_{3/2}R_{a3})_{4+2n}O$, and the rest of $Y_1$ and $Y_2$ is O or $NR_{a4}$, n is an integer of 1 to 20, and $R_{a1}$ to $R_{a4}$ are each independently a substituted or unsubstituted alkyl group having 1 to 12 carbon atoms.

7. The display module of claim 6, wherein the first polymer resin is represented by any one among Formula 1 to Formula 9 below:

[Formula 1]

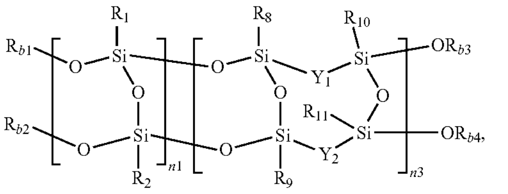

[Formula 2]

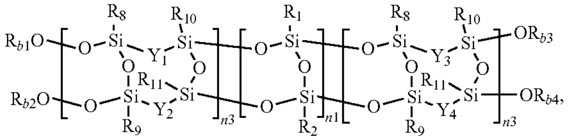

[Formula 3]

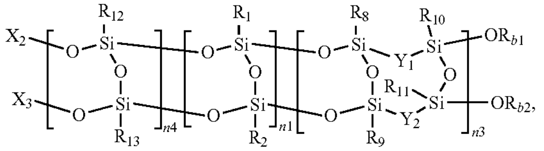

Formula 4]

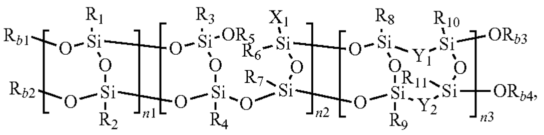

[Formula 5]

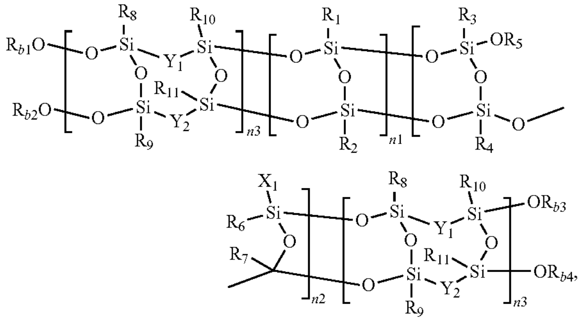

[Formula 6]

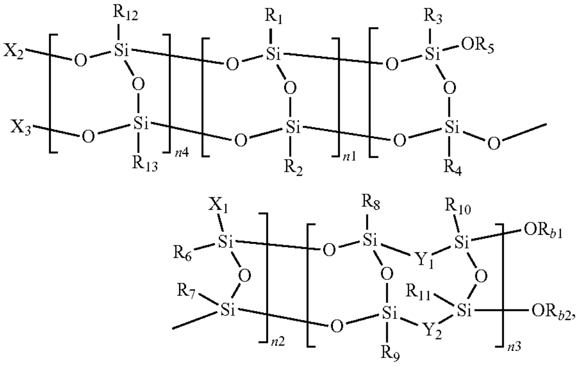

-continued

[Formula 7]

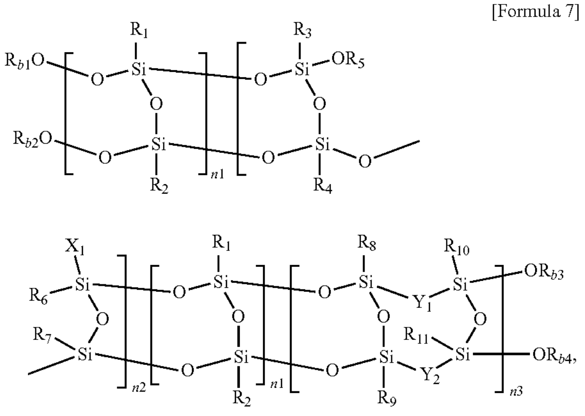

[Formula 8]

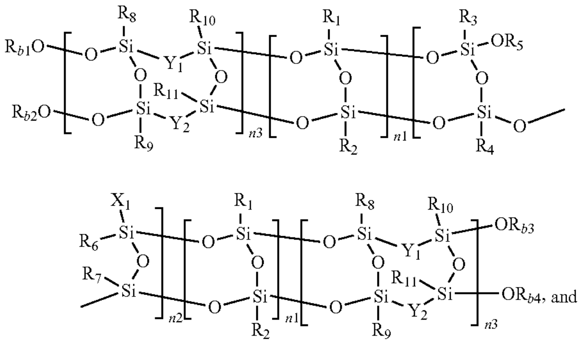

and

[Formula 9]

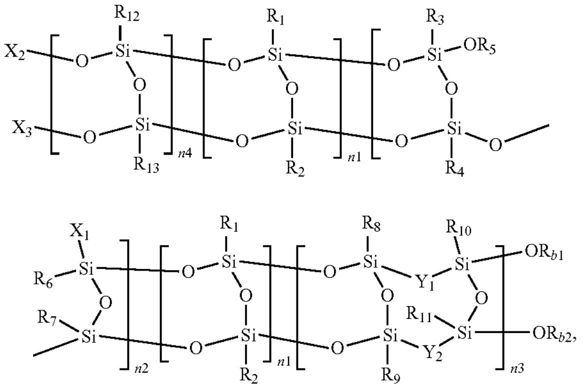

wherein, in Formula 1 to Formula 9 above, at least one among $X_1$ to $X_3$ is $(SiO_{3/2}R_{c1})_{4+2k}O$, and the rest of $X_1$ to $X_3$ are $R_{c2}$, n1 and n3 are each independently an integer of 1 to 100,000, n2 is an integer of 1 to 500, and n4 is 1 or 2, $R_{c1}$, $R_{c2}$, and $R_{b1}$ to $R_{b4}$ are each independently a substituted or unsubstituted alkyl group having 1 to 12 carbon atoms, k is an integer of 1 to 20, and $R_1$ to $R_{13}$, $Y_1$ and $Y_2$ are the same as defined in Formula A to Formula D.

8. The display module of claim 6, wherein the second polymer resin is represented by any one among Formula 10 to Formula 14 below:

[Formula 10]

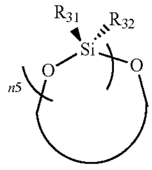

,

[Formula 11]

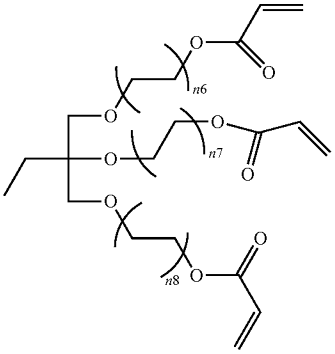

,

[Formula 12]

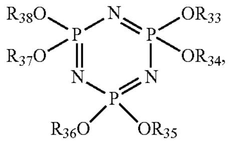

[Formula 13]

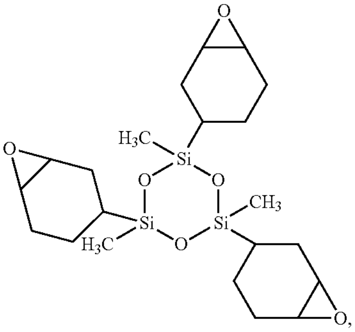

and

[Formula 14]

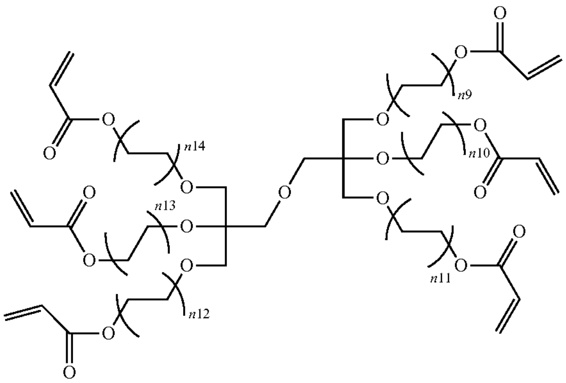

, wherein, in Formula 10 to Formula 14 above, n5 is an integer of 1 to 20, n6 to n8 are each independently an integer of 1 to 5, and n9 to n14 are each independently an integer of 1 to 12, $R_{31}$ to $R_{38}$ are represented by R-1 or R-2 below:

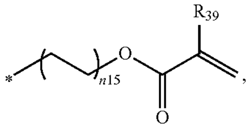

, and

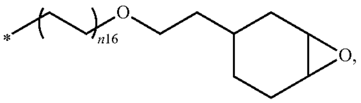

wherein, in R-1 and R-2 above, n15 and n16 are each independently an integer of 1 to 12, and $R_{39}$ is a hydrogen atom or a methyl group.

9. The display module of claim 1, wherein the reflection preventing layer comprises:

a first layer disposed on the overcoating layer;

a second layer disposed on the first layer; and a third layer which is disposed on the second layer and has a refractive index lower than each of refractive indices of the first and second layers.

10. The display module of claim 9, wherein the reflection preventing layer further comprises a fourth layer disposed between the second layer and the third layer.

11. The display module of claim 10, wherein the fourth layer has a thickness of about 20 nm to about 50 nm.

12. The display module of claim 10, wherein the fourth layer has a refractive index of about 1.45 to about 1.69.

13. The display module of claim 9, wherein the first layer has the refractive index of about 1.60 to about 1.69, the second layer has the refractive index of about 1.70 to about 1.90, and the third layer has the refractive index of about 1.23 to about 1.40.

14. The display module of claim 9, wherein each of the first layer, the second layer, and the third has a thickness of about 50 nm to about 150 nm.

15. A display device comprising a display module, wherein the display module comprises:

a display panel;

a light control layer which is disposed directly on the display panel and comprises quantum dots and scatterers;

a color filter layer disposed on the light control layer;

an overcoating layer disposed on the color filter layer; and a reflection preventing layer disposed on the overcoating layer, wherein the overcoating layer comprises a light absorber which absorbs light in a wavelength region of about 410 nm to about 750 nm, wherein the reflection preventing layer comprises a first layer disposed on the overcoating layer, a second layer disposed on the first layer, and a third layer which is disposed on the second layer and has a refractive index lower than each of refractive indices of the first and second layers, and wherein the light absorber is represented by any one in Compound Group 1 below:
[Compound Group 1]
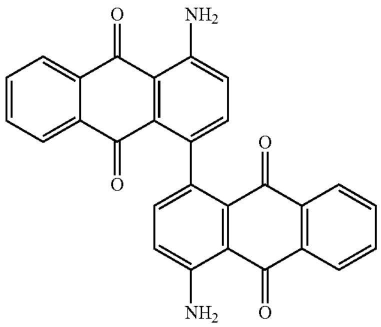
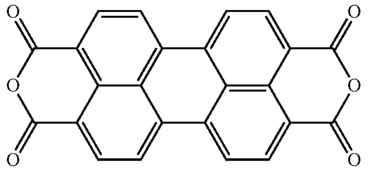
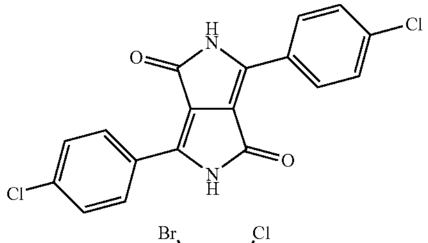
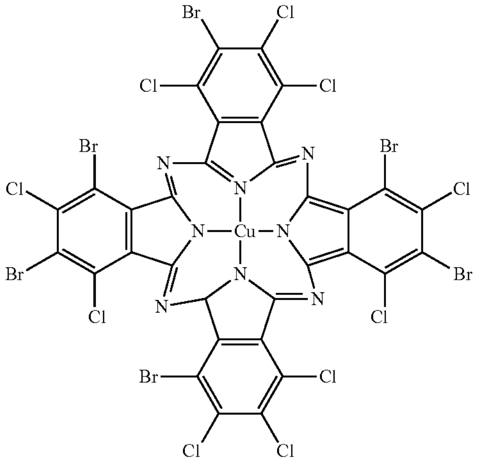
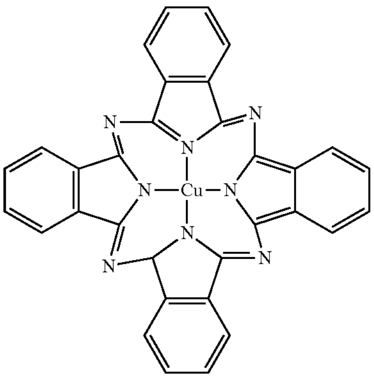
-continued
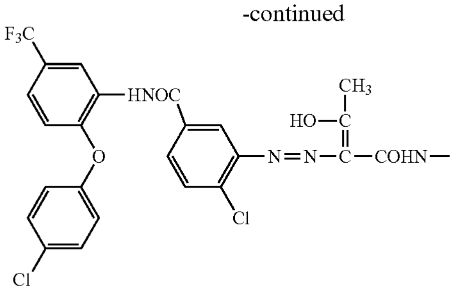
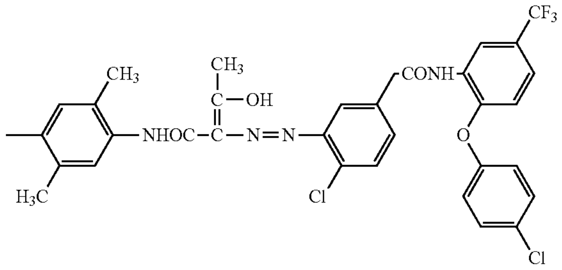
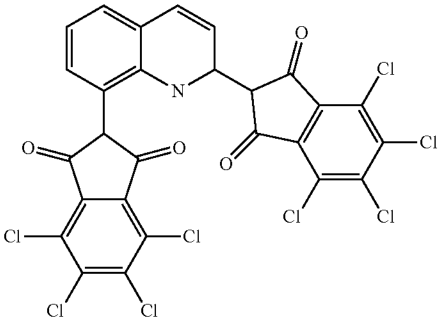
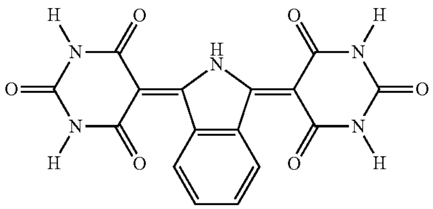
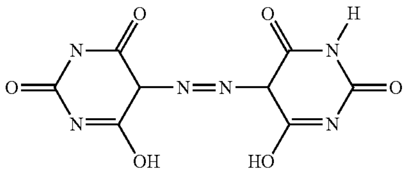
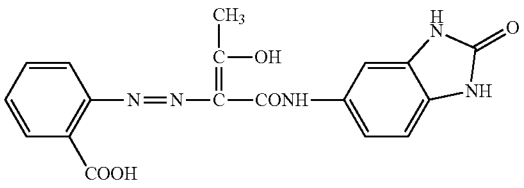

-continued
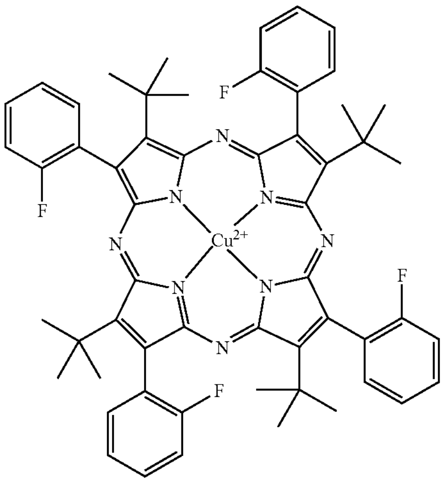
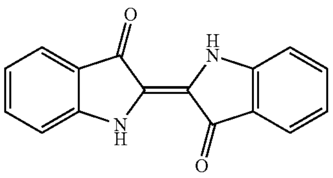
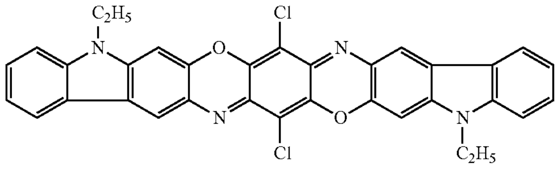
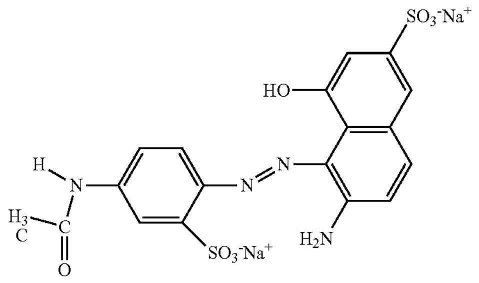
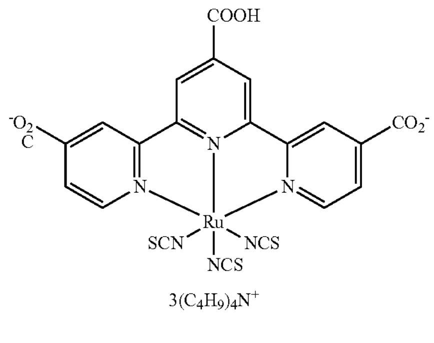
-continued
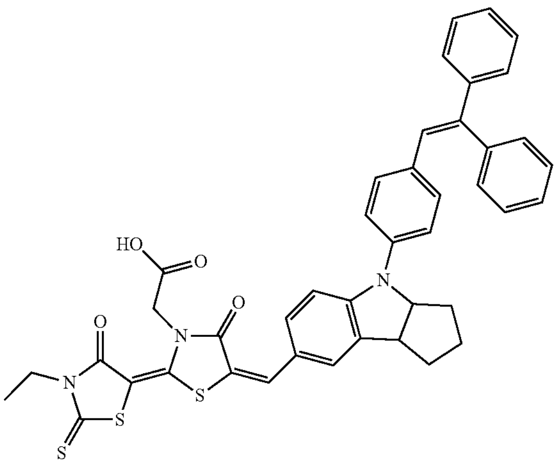
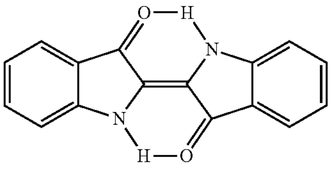
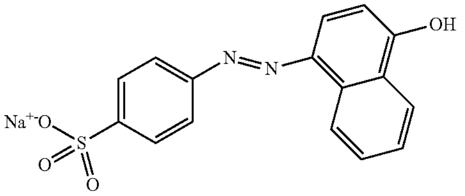
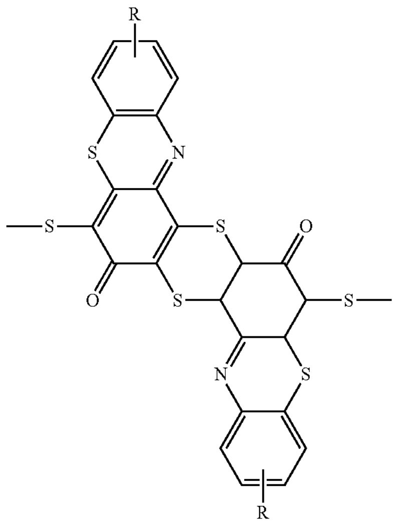

-continued

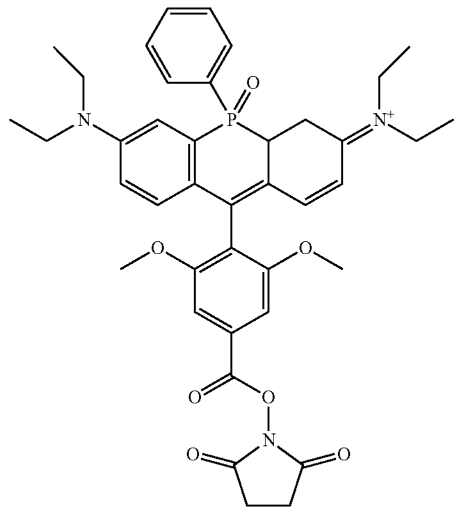

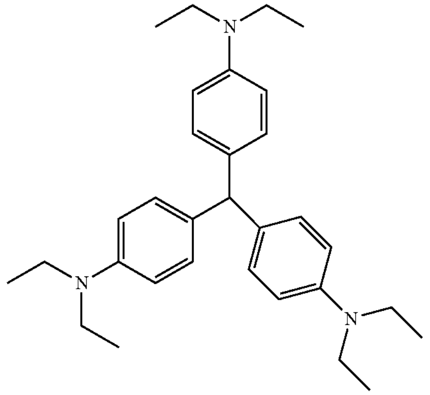

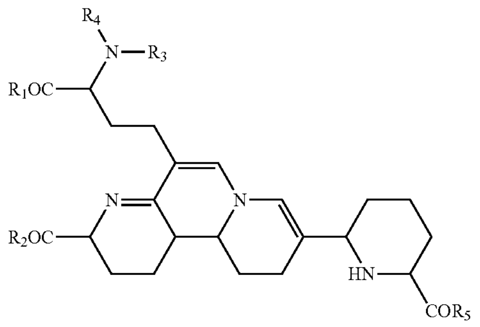

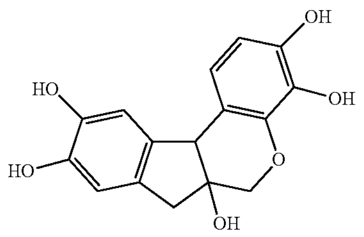

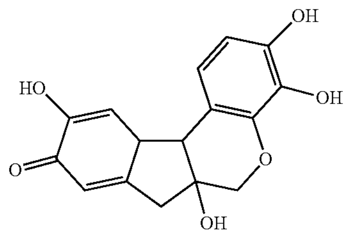

-continued

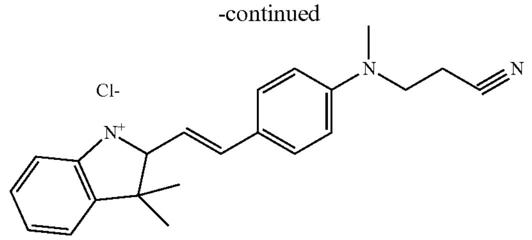

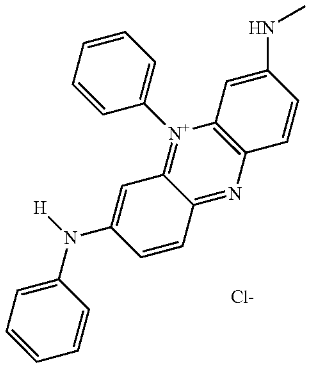

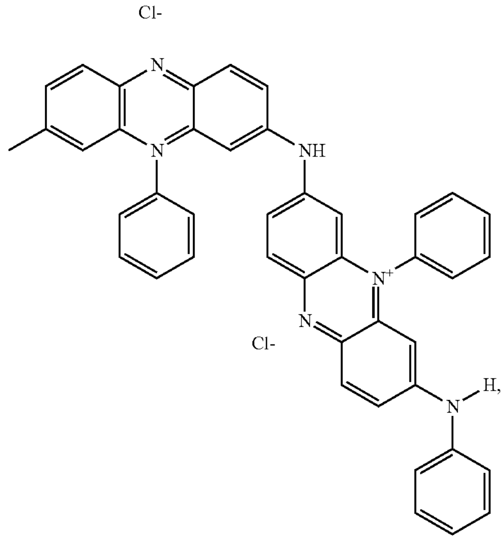

wherein, in Compound Group 1 above, R, $R_1$, $R_2$, $R_3$, $R_4$, and $R_5$ are each independently a hydrogen atom, a deuterium atom, a halogen atom, an isocyanate group, a cyano group, a nitro group, a nitrile group, a substituted or unsubstituted amine group, a substituted or unsubstituted oxy group, a substituted or unsubstituted thio group, a substituted or unsubstituted alkyl group having 1 to 12 carbon atoms, a substituted or unsubstituted heterocycloalkyl group having 2 to 12 carbon atoms, a substituted or unsubstituted alkenyl group having 2 to 12 carbon atoms, a substituted or unsubstituted aryl group having 6 to 12 ring-forming carbon atoms, or a substituted or unsubstituted heteroaryl group having 2 to 12 ring-forming carbon atoms.

16. The display device of claim 15, wherein the overcoating layer has a refractive index of about 1.45 to about 1.53.

17. The display device of claim 15, wherein the overcoating layer has a thickness thicker than the first to third layers.

18. The display device of claim 17, wherein each of the first to third layers has a thickness of about 50 nm to about 150 nm, and the overcoating layer has the thickness of about 3 μm to about 15 μm.

19. The display device of claim 15, wherein the overcoating layer is formed of an overcoating layer-forming composition containing the light absorber, and the light absorber contained in the overcoating layer-forming composition is contained in an amount of about 6 wt % to about 20 wt % with respect to the total weight of the overcoating layer-forming composition.

* * * * *